United States Patent
Rusanovskyy

(10) Patent No.: US 10,257,541 B2
(45) Date of Patent: Apr. 9, 2019

(54) METHOD AND APPARATUS FOR ENCODING AND DECODING VIDEO SIGNAL USING ADAPTIVE SAMPLING

(71) Applicant: LG ELECTRONICS, INC., Seoul (KR)

(72) Inventor: Dmytro Rusanovskyy, Santa Clara, CA (US)

(73) Assignee: LG ELECTRONICS INC., Seoul (KR)

(*) Notice: Subject to any disclaimer, the term of this patent is extended or adjusted under 35 U.S.C. 154(b) by 246 days.

(21) Appl. No.: 15/103,210

(22) PCT Filed: Dec. 19, 2014

(86) PCT No.: PCT/KR2014/012587
§ 371 (c)(1),
(2) Date: Jun. 9, 2016

(87) PCT Pub. No.: WO2015/093895
PCT Pub. Date: Jun. 25, 2015

(65) Prior Publication Data
US 2018/0167638 A1    Jun. 14, 2018

Related U.S. Application Data

(60) Provisional application No. 61/918,678, filed on Dec. 20, 2013.

(51) Int. Cl.
*H04N 19/82*    (2014.01)
*H04N 19/117*    (2014.01)
*H04N 19/132*    (2014.01)
*H04N 19/184*    (2014.01)
*H04N 19/80*    (2014.01)
*H04N 19/136*    (2014.01)

(52) U.S. Cl.
CPC ........... *H04N 19/82* (2014.11); *H04N 19/117* (2014.11); *H04N 19/132* (2014.11); *H04N 19/136* (2014.11); *H04N 19/184* (2014.11); *H04N 19/80* (2014.11)

(58) Field of Classification Search
None
See application file for complete search history.

(56) References Cited

U.S. PATENT DOCUMENTS

2006/0294171 A1    12/2006    Bossen et al.
2009/0268978 A1    10/2009    Paniconi
(Continued)

FOREIGN PATENT DOCUMENTS

CN    101208957 A    6/2008
GB    2498550 A    7/2013
WO    2015/076634 A1    5/2015

*Primary Examiner* — Anand S Rao
*Assistant Examiner* — Tyler B Edwards
(74) *Attorney, Agent, or Firm* — Dentons US LLP

(57) ABSTRACT

Disclosed herein is a method of encoding and decoding a video signal using adaptive sampling. The method may include determining an adaptive sampling rate based on information about the properties of a decoded picture and performing interpolation filtering using samples to which the adaptive sampling rate has been applied. The adaptive sampling rate corresponds to one of a uniform sampling rate, a reduced sampling rate, and a variable sampling rate.

13 Claims, 14 Drawing Sheets

(56) References Cited

U.S. PATENT DOCUMENTS

2012/0147967 A1* 6/2012 Panchal ............... H04N 19/117
                                                            375/240.17
2012/0169845 A1   7/2012 Kim et al.
2013/0188883 A1* 7/2013 Gisquet ................ G06T 9/004
                                                            382/233

* cited by examiner

【Figure 1】
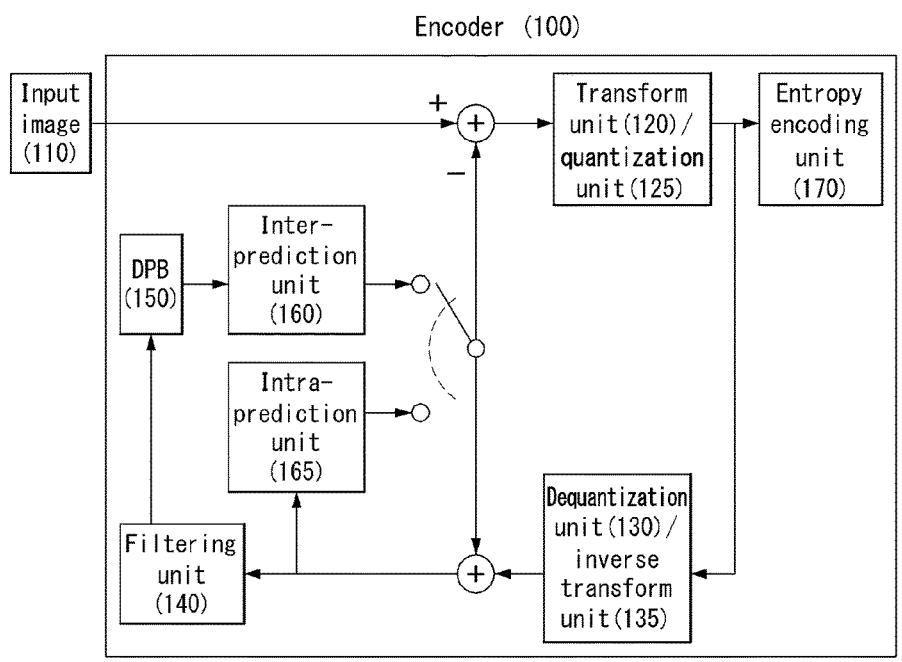

【Figure 2】
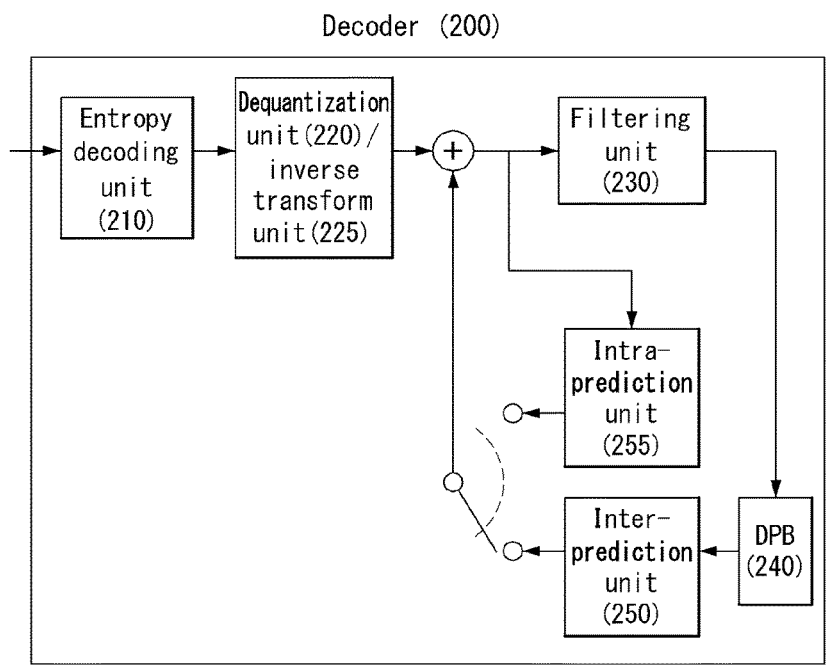

[Figure 3]

【Figure 4】
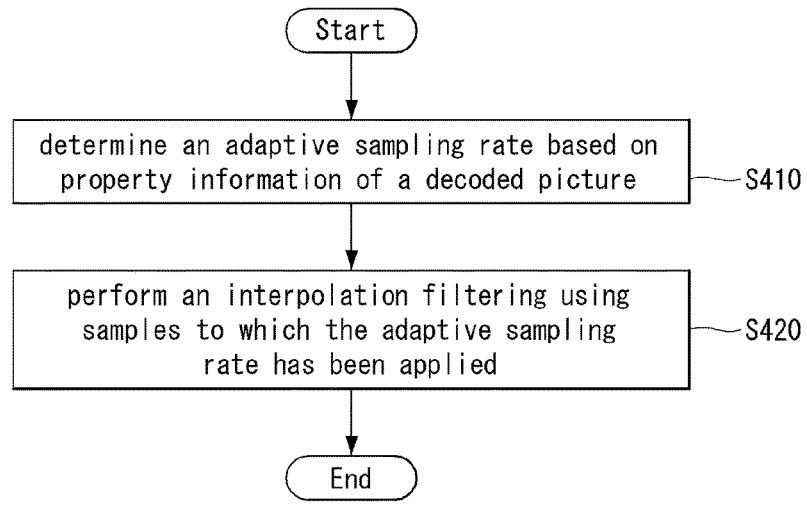
【Figure 5】
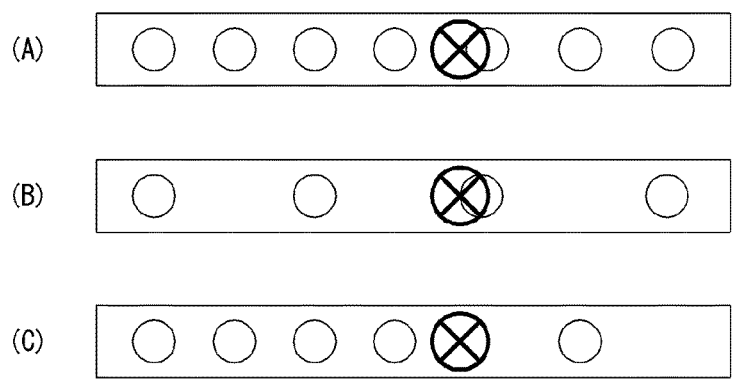

[Figure 6]
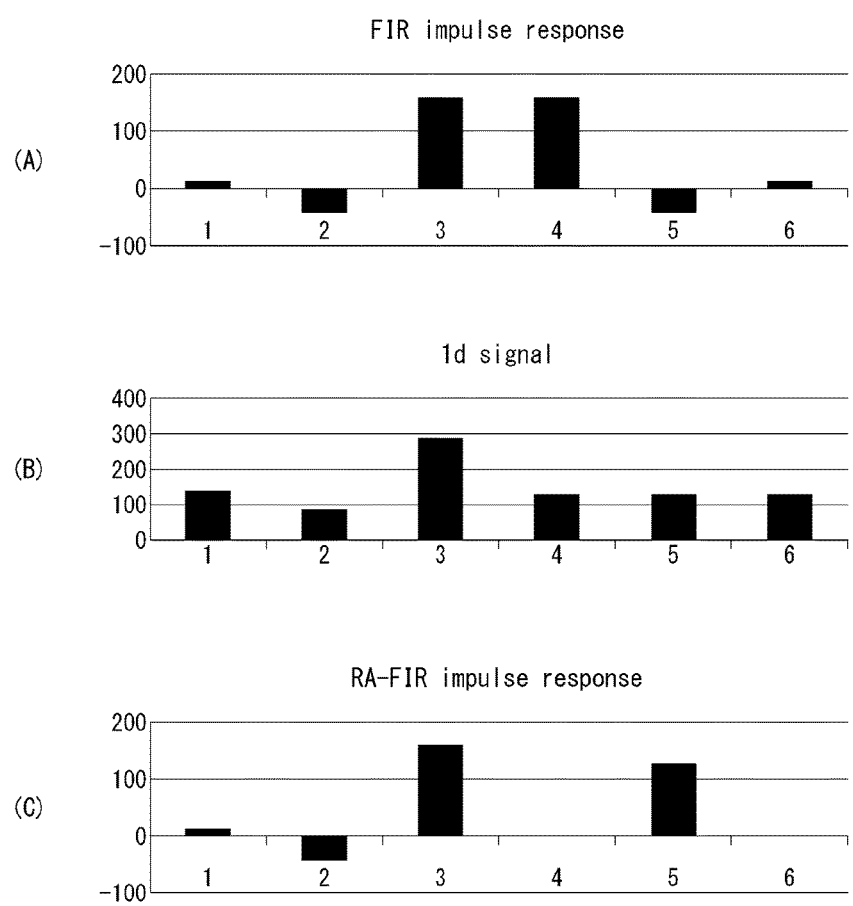

【Figure 7】

| S710 | if (CuPredMode[ x0 ][ y0 ] == MODE_INTRA) && (IntraPredModeY[ x0 ][ x0 ] == 1) |
|---|---|
| | { |
| S720 | if (coded_sub_block_flag[ xS ][ yS ] == 0) for all ( xS, yS ) != ( 0, 0 ) |
| | { |
| S730 | if ( LastSignificantCoeffX, LastSignificantCoeffY ) == ( 0, 0 ) ) |
| S740 | define HF = HFSA, as it shown in Eq(9), |
| S750 | otherwise: |
| S760 | define HF as shown in Eq(7). |
| | } |
| | } |

【Figure 8】

| S810 | if (CuPredMode[ x0 ][ y0 ] == MODE_INTRA) && (IntraPredModeY[ x0 ][ x0 ] == 1) |
|---|---|
| | { |
| S820 | if (coded_sub_block_flag[ xS ][ yS ] == 0) for all ( xS, yS ) != ( 0, 0 ) |
| | { |
| S830 | if (transformBlock[j][i] ==0 for all ( j, i ) != (0, 0) ) |
| S840 | define HF = HFSA, as it shown in Eq(9), |
| S850 | otherwise: |
| S860 | define HF as shown in Eq(7). |
| | } |
| | } |

【Figure 9】
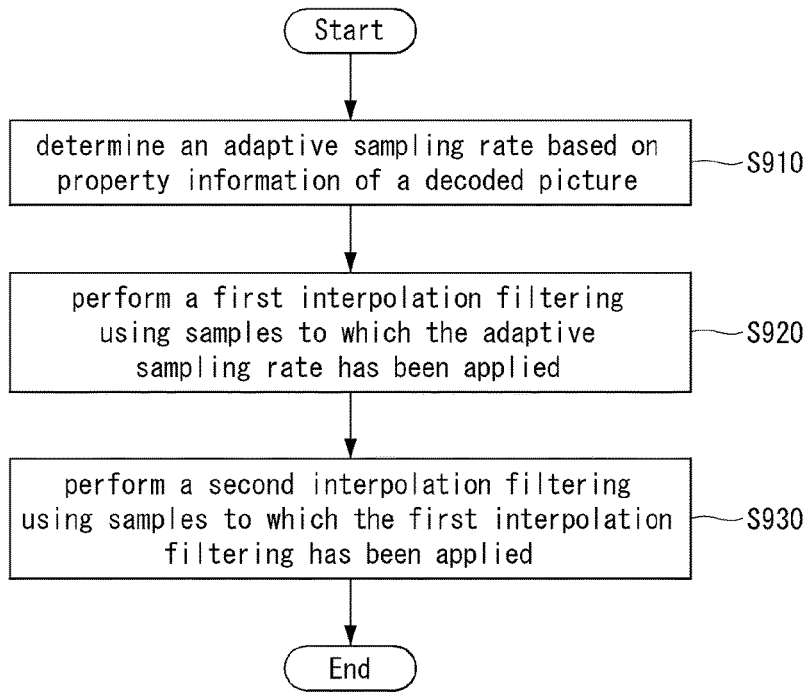
【Figure 10】
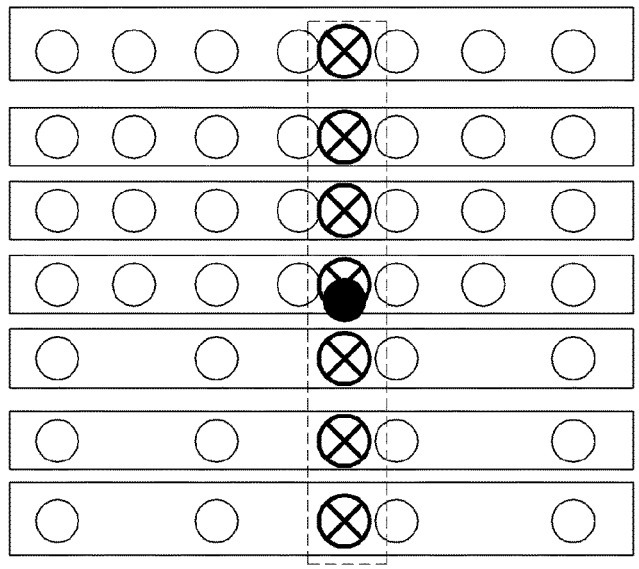

【Figure 11】
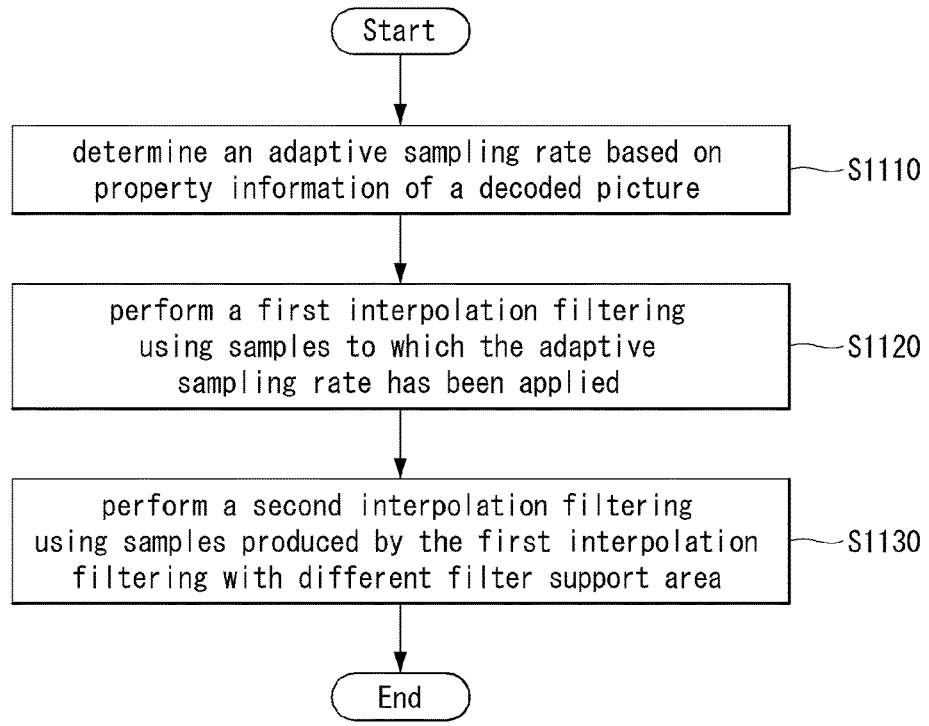
【Figure 12】
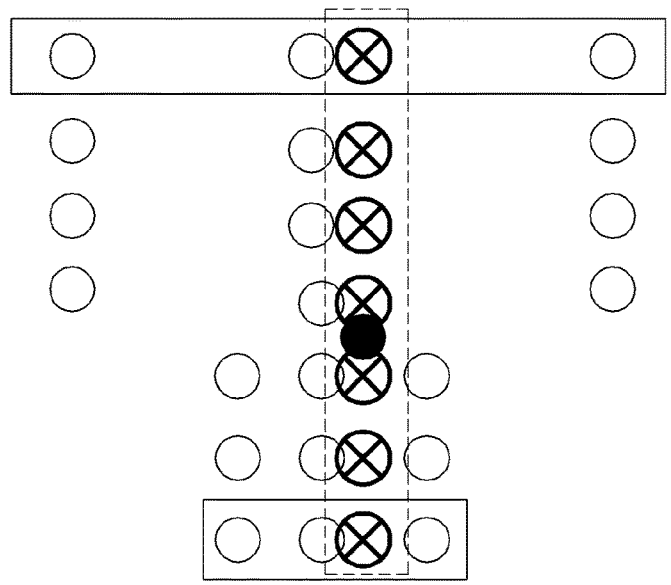

【Figure 13】
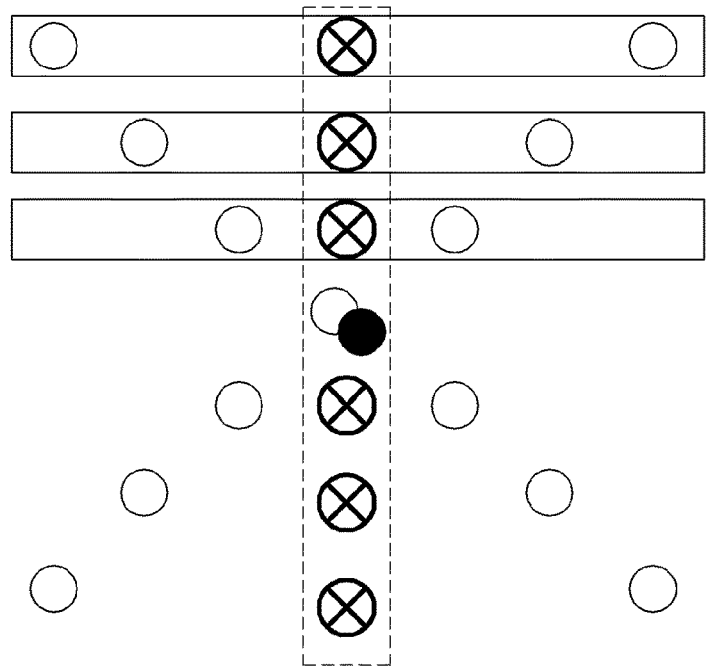
【Figure 14】
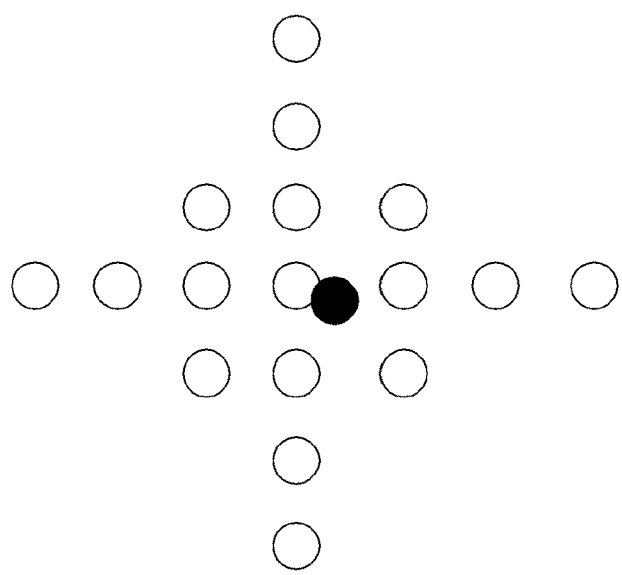

【Figure 15】
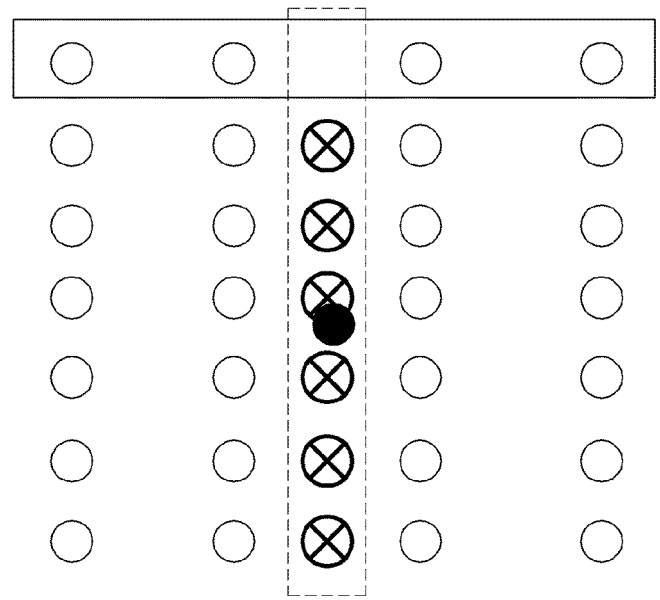
【Figure 16】
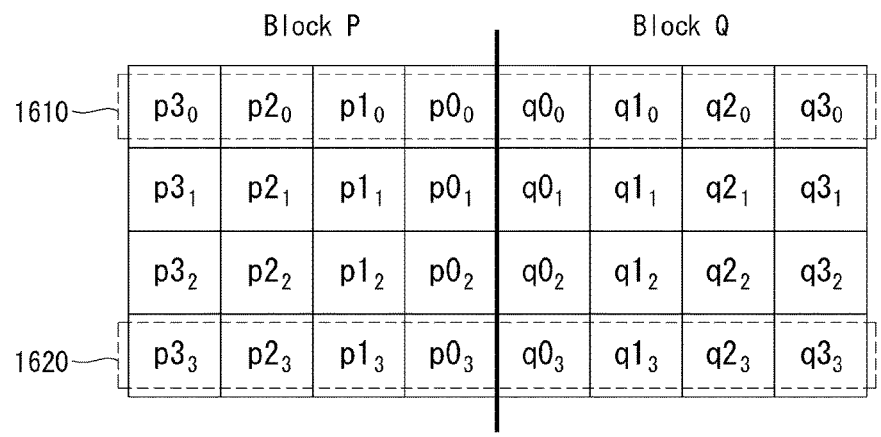

【Figure 17】
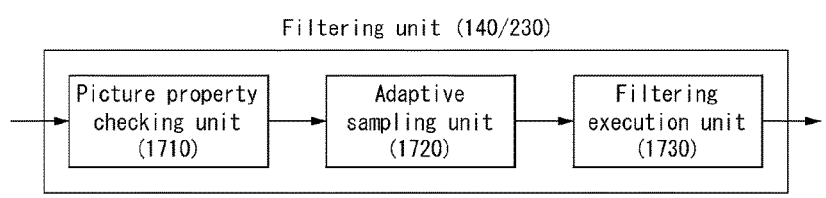
【Figure 18】
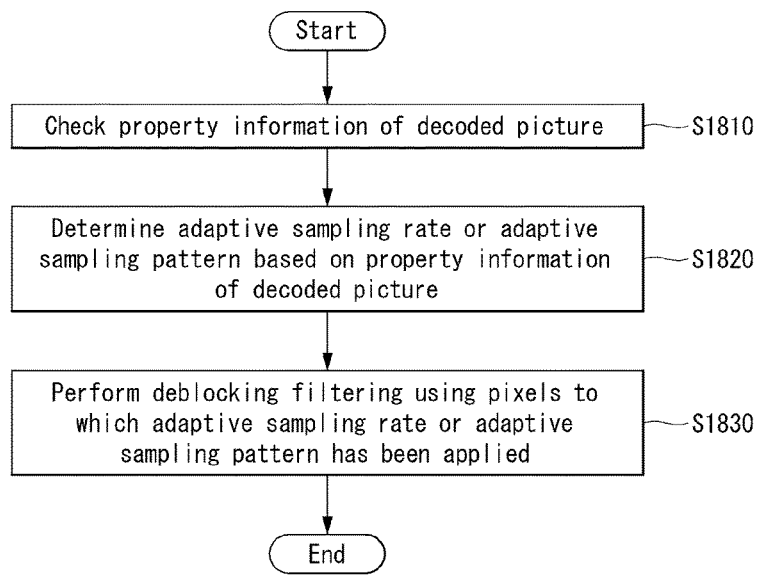

【Figure 19】
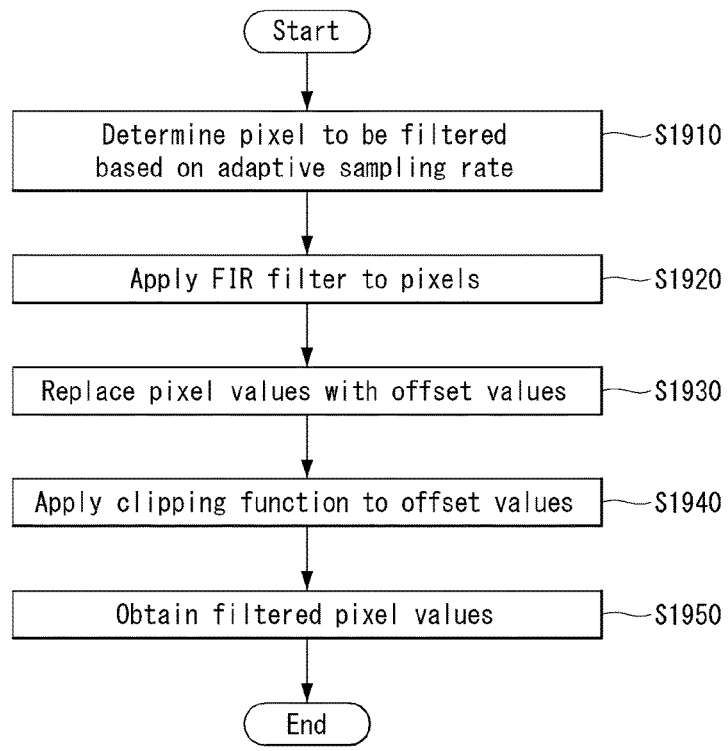
【Figure 20】
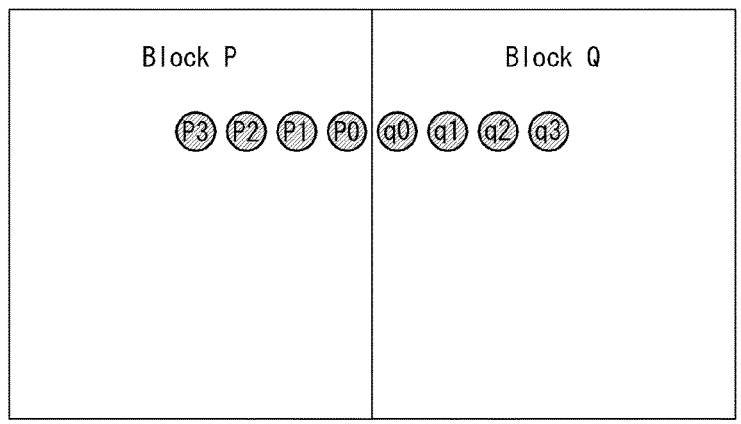

【Figure 21】
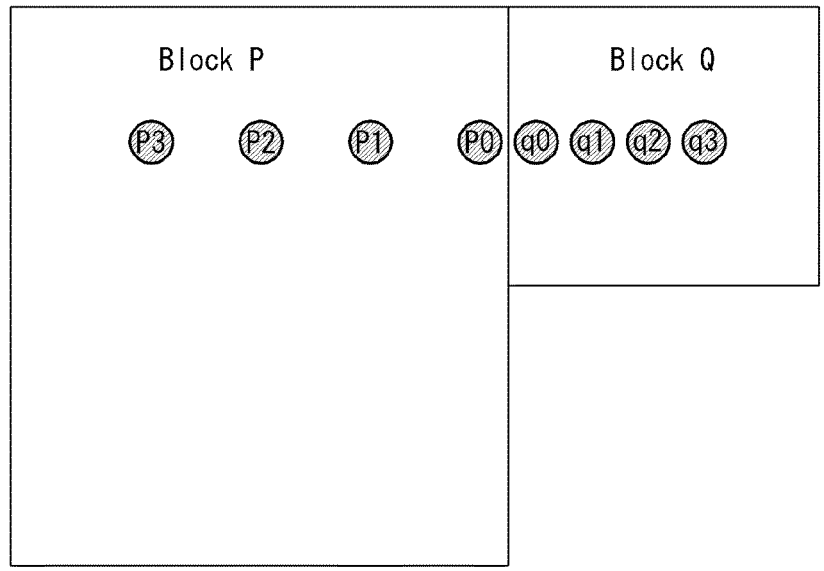
【Figure 22】
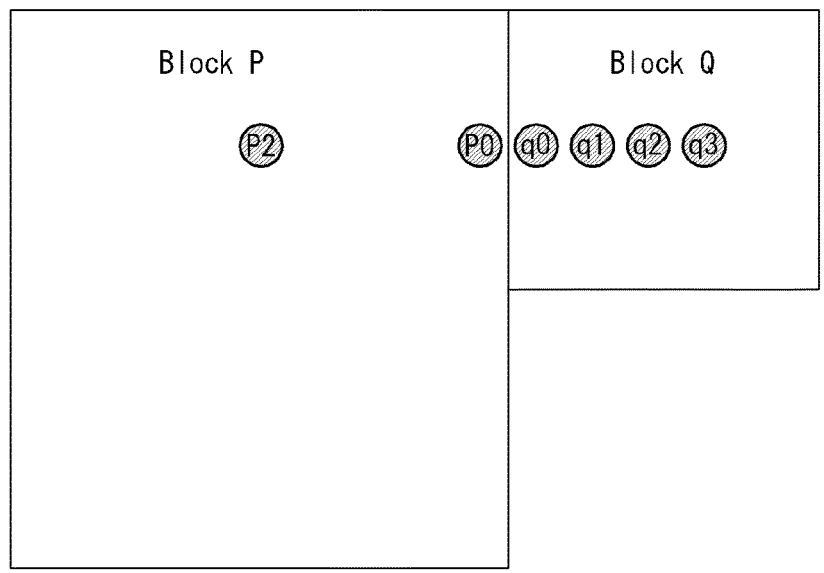

【Figure 23】
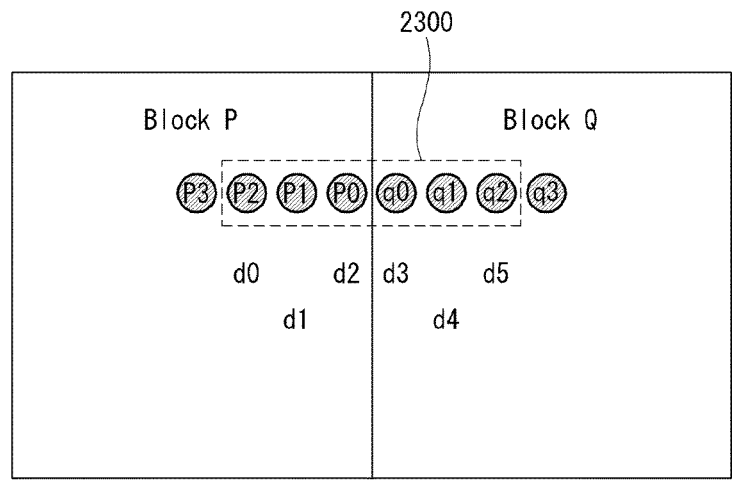
【Figure 24】
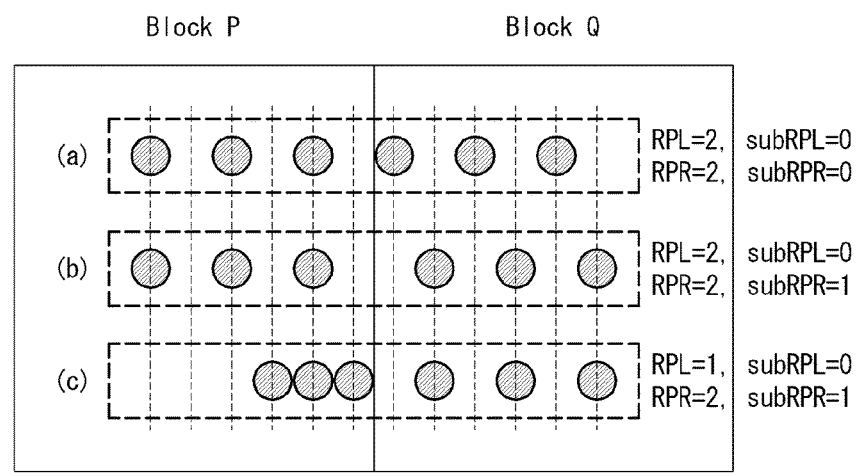

METHOD AND APPARATUS FOR ENCODING AND DECODING VIDEO SIGNAL USING ADAPTIVE SAMPLING

This application is a National Stage Application of International Application No. PCT/KR2014/012587, filed Dec. 19, 2014, and claims the benefit of U.S. Provisional Application No. 61/918,678, filed Dec. 20, 2013, and the contents of which are incorporated herein by reference in their entirety for all purposes as if fully set forth below.

TECHNICAL FIELD

The present invention relates to a method and apparatus for encoding and decoding a video signal using adaptive sampling and, more particularly, to an adaptive sampling method in interpolation filtering process.

BACKGROUND ART

Compression coding means a series of signal processing technologies for sending digitalized information through a communication line or storing digitalized information in a form suitable for a storage medium. Media, such as video, an image, and voice, may be the subject of compression coding. In particular, a technology for performing compression coding on video is called video compression.

The next-generation video content expects to feature high spatial resolution, a high frame rate, and high dimensionality of a video scene representation. The processing of such content would require a significant increase in memory storage, a memory access rate, and processing power.

Accordingly, it is desirable to design a coding tool which address these foreseen challenges and offer some solutions. In particular, in an existing video coding method, interpolation filtering is not adaptive to local signal complexity. Accordingly, there is a need for a more efficient sampling method in interpolation filtering process.

DISCLOSURE

Technical Problem

An embodiment of the present invention is to enable the design of a coding tool for high efficiency compression and to reduce required computation resources.

Furthermore, an embodiment of the present invention is to apply to a step that requires locally adaptive sampling in a process of encoding or decoding a video signal.

Furthermore, an embodiment of the present invention is to apply locally adaptive sampling in the interpolation filtering step of a video signal.

Furthermore, an embodiment of the present invention is to determine an adaptive sampling rate based on the properties (e.g., a block size and picture parameters) of a coded picture.

Technical Solution

The present invention provides a locally adaptive sampling method in coding a video signal.

Furthermore, the present invention provides a method applied to a step that requires locally adaptive sampling in a process of encoding or decoding a video signal.

Furthermore, the present invention provides a method of accessing the samples of a picture for up-sampling through an adaptive sampling grid that may be derived based on the properties (e.g., a block size and picture parameters) of a coded picture.

Furthermore, the present invention provides a method using locally adaptive sampling in the interpolation filtering step of a video signal.

Furthermore, the present invention provides a method of determining an adaptive sampling rate or an adaptive sampling pattern based on information about the properties of a decoded picture.

Furthermore, the present invention provides a method of performing interpolation filtering using pixels to which an adaptive sampling rate or an adaptive sampling pattern has been applied.

Furthermore, the present invention provides a method of determining an adaptive sampling rate including at least one of a uniform sampling rate, a reduced sampling rate, and a variable sampling rate within a filter support area.

Furthermore, the present invention provides a method of determining a variable sampling rate using different sampling rates within a filter support area.

Furthermore, the present invention provides a two-dimensional (2D) interpolation filtering method having different filter support areas.

Furthermore, the present invention provides a 2D interpolation filtering method having different sampling rates.

Furthermore, the present invention provides a method of identically applying the adaptive sampling rate or the adaptive sampling pattern to a left block and a right block if the size of the left block is the same as that of the right block on the basis of a block boundary.

Furthermore, the present invention provides a method of differently applying the adaptive sampling rate or the adaptive sampling pattern to a left block and a right block if the size of the left block is different from that of the right block on the basis of a block boundary.

Furthermore, the present invention provides a method of applying the adaptive sampling rate or the adaptive sampling pattern to a block having a larger size with a low frequency sampling or a reduced sampling.

Furthermore, the present invention provides a method of applying the adaptive sampling rate by scaling an offset value with a rate conversion value.

Furthermore, the present invention provides a method of differently applying the rate conversion value to a left block and a right block on the basis of a block boundary.

Furthermore, the present invention provides a method of additionally adjusting the location of the samples based on a sub-rate conversion offset value.

Advantageous Effects

The present invention can enable the design of a coding tool for high efficiency compression and can also significantly reduce required computation resources, memory requirements, a memory access bandwidth, and computation complexity by proposing a locally adaptive sampling method.

Furthermore, a compression tool having a higher coding gain can be designed by removing redundancy and noise in determining a sample value.

DESCRIPTION OF DRAWINGS

FIG. 1 illustrates a schematic block diagram of an encoder configured to encode a video signal in an embodiment to which the present invention is applied;

FIG. 2 illustrates a schematic block diagram of a decoder configured to decode a video signal in an embodiment to which the present invention is applied;

FIG. 3 schematically illustrates the relationship between the positions of samples within a block which is used to perform interpolation filtering in an embodiment to which the present invention is applied;

FIG. 4 is a flowchart illustrating a method of performing interpolation filtering to which adaptive sampling is applied in an embodiment to which the present invention is applied;

FIG. 5 illustrates 1D interpolation filtering to which adaptive sampling is applied in an embodiment to which the present invention is applied, wherein FIG. 5A illustrates 1D interpolation filtering to which a uniform sampling rate is applied, FIG. 5B illustrates 1D interpolation filtering to which a reduced sampling rate is applied, and FIG. 5C illustrates 1D interpolation filtering to which a variable sampling rate is applied;

FIG. 6 illustrates a signal and response characteristics for illustrating filtering to which adaptive sampling is applied in an embodiment to which the present invention is applied, wherein FIG. 6A illustrates the response characteristics of an FIR filter, FIG. 6B illustrates the characteristics of a 1D signal, and FIG. 6C illustrates the response characteristics of an FIR filter to which adaptive sampling has been applied;

FIG. 7 illustrates syntax for deriving an adaptive filter based on information about a spatial variance of a coded signal in an embodiment to which the present invention is applied;

FIG. 8 illustrates syntax for deriving an adaptive filter based on a transform coefficient in an embodiment to which the present invention is applied;

FIG. 9 is a flowchart illustrating a method of performing 2D interpolation filtering to which different Rate Parameter (RP) values are applied in an embodiment to which the present invention is applied;

FIG. 10 illustrates 2D interpolation filtering to which different RP values are applied in an embodiment to which the present invention is applied;

FIG. 11 is a flowchart illustrating a method of performing 2D interpolation filtering to which different filter support areas are applied in an embodiment to which the present invention is applied;

FIG. 12 illustrates 2D interpolation filtering to which different filter support areas are applied in an embodiment to which the present invention is applied;

FIGS. 13 and 14 illustrate 2D interpolation filtering to which a variable sampling rate is applied in embodiments to which the present invention is applied; and FIG. 15 illustrates 2D interpolation filtering to which a reduced sampling rate is applied in an embodiment to which the present invention is applied.

FIG. 16 schematically illustrates location relationships between samples within a block used when filtering is performed in accordance with an embodiment to which the present invention is applied;

FIG. 17 is a schematic internal block diagram of a filtering unit for performing locally adaptive sampling in accordance with an embodiment to which the present invention is applied;

FIGS. 18 and 19 are embodiments to which the present invention is applied, wherein FIG. 18 is a flowchart illustrating a method of performing locally adaptive sampling and FIG. 19 is a flowchart illustrating a method of performing filtering using locally adaptive sampling.

FIGS. 20 to 22 are diagrams illustrating that an adaptive sampling rate is determined based on the property information of a decoded picture in accordance with embodiments to which the present invention is applied;

FIG. 23 is a diagram illustrating a method of performing filtering using locally adaptive sampling in accordance with an embodiment to which the present invention is applied; and FIG. 24 illustrates various examples in which a sampling is performed using a rate conversion value and a sub-rate conversion offset value in accordance with an embodiment to which the present invention is applied.

BEST MODE

In accordance with an aspect of the present invention, there is provided a method of performing interpolation filtering on a video signal, including determining an adaptive sampling rate based on information about the properties of a decoded picture and performing first interpolation filtering using samples to which the adaptive sampling rate has been applied, wherein the adaptive sampling rate corresponds to one of a uniform sampling rate, a reduced sampling rate, and a variable sampling rate.

If the adaptive sampling rate corresponds to the reduced sampling rate, the first interpolation filtering may be performed based on a uniformly reduced tap length over a filter support area.

If the adaptive sampling rate corresponds to the variable sampling rate, the interpolation filtering may be performed using different sampling rates within a filter support area.

The method may further include performing second interpolation filtering using samples to which the first interpolation filtering has been applied.

The method may further include performing second interpolation filtering using samples produced by the interpolation filtering within different filter support areas.

The adaptive sampling rate may be determined based on a rate conversion parameter.

The adaptive sampling rate may be determined based on a distance function according to the position of an interpolated sample.

The first and the second interpolation filtering may be performed at different sampling rates, and the sampling rates of the first and the second interpolation filtering may be determined based on a rate conversion parameter.

The information about the properties of the decoded picture may include at least one of a block size and a picture parameter.

The picture parameter may be obtained from a coded bit stream or derived from the decoded picture.

In accordance with an aspect of the present invention, there is provided an apparatus of performing an interpolation filtering on a video signal, comprising: a picture property checking unit configured to check property information of a decoded picture, an adaptive sampling unit configured to determine an adaptive sampling rate based on the property information of the decoded picture, and an interpolation filter configured to perform a first interpolation filtering using samples to which the adaptive sampling rate has been applied, wherein the adaptive sampling rate corresponds to one of an uniform sampling rate, a reduced sampling rate, or a variable sampling rate within a filter support area.

The interpolation filter is further configured to perform a second interpolation filtering using samples to which the first interpolation filtering has been applied.

The interpolation filter is further configured to perform a second interpolation filtering using samples produced by the interpolation filtering with different filter support area.

MODE FOR INVENTION

Hereinafter, exemplary elements and operations in accordance with embodiments of the present invention are described with reference to the accompanying drawings. It is however to be noted that the elements and operations of the present invention described with reference to the drawings are provided as only embodiments and the technical spirit and kernel configuration and operation of the present invention are not limited thereto.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be properly replaced and interpreted in each coding process.

The present invention proposes a method using locally adaptive sampling in video coding. More specifically, the present invention provides a method using locally adaptive sampling in interpolation filtering step for video coding.

The present invention provides a method of accessing the samples of a picture for up-sampling through an adaptive sampling grid that may be derived based on the properties (e.g., a block size and picture parameters) of a coded picture.

In accordance with an embodiment of the present invention, there is provided a method of performing interpolation filtering to which adaptive sampling is applied. For example, there are proposed a 1D interpolation filtering method and a 2D interpolation filtering method to which adaptive sampling is applied. In this case, the adaptive sampling may include at least one of a uniform sampling rate, a reduced sampling rate, and a variable sampling rate.

More specifically, the present invention provides a method of deriving an adaptive filter based on information about a spatial variance of a coded signal. Furthermore, the present invention provides a method of deriving an adaptive filter based on a transform coefficient. In this case, the adaptive filter may mean a filter to which the adaptive sampling has been applied.

Furthermore, the present invention can provide a method of performing 2D interpolation filtering to which different RP values are applied and a method of performing 2D interpolation filtering to which different filter support areas are applied.

An adaptive sampling rate may be applied to the samples of a decoded picture located at a block boundary. The adaptive sampling rate may be extracted from information about the properties of a coded picture (e.g., a block size and picture parameters). For example, the adaptive sampling may be applied in at least one of a sequence level, a slice level, a frame level, a picture level, a block level, a pixel level, or a coding-related unit (e.g., a prediction unit, a transform unit, and a coding unit) level.

Accordingly, the present invention can enable the design of a coding tool for high efficiency compression and can also reduce required computation resources (e.g., memory requirements, a memory access bandwidth, and computation complexity).

An example of adaptive sampling in video coding is as follows.

Skip mode may be interpreted as locally adaptive sampling in a time direction. Furthermore, in video coding, block partitioning may be interpreted as adaptive sampling for coding parameters, motion information, and coding mode.

Furthermore, when deblocking filtering is performed, some decision-making processes are performed at a block level without accessing sampling data. This may be interpreted as locally adaptive sampling for using coding parameters (e.g., motion information, coding mode, and a transform size) of a coded picture.

Furthermore, an adaptive resolution change at a sequence level may also be interpreted as locally adaptive sampling. In some applications, a video encoder may select a resolution for representing video data which provides an optimal Rate-Distortion (RD) cost and performs video signal resampling prior to coding. For example, a side information signaling mechanism (e.g., SEI messages) may be utilized to specify decoder operations for resampling decoded video to the original resolution.

Furthermore, an adaptive resolution change at a picture level may also be interpreted as locally adaptive sampling. In some applications, a video encoder may select a resolution for representing a coded picture which provides an optimal RD cost and performs video signal resampling prior to coding. In such systems, a decoder would perform normative resampling/resolution normalization for every specific picture before placing it in a DPB unit or in a reference picture list. Scalable video coding systems may be examples of such systems.

Furthermore, in accordance with an embodiment to which the present invention is applied, the following adaptive filtering method may be used in interpolation filtering process for video coding. For example, a filter structure is not changed, but a filter coefficient may be adaptively applied. In this case, the filter coefficient may be changed over time or depending on a filter support area. Such a method may be performed by updating the weight of a filter pulse response in real time or through the parallel execution of a plurality of filters or switching between the plurality of filters. Furthermore, the adaptive filtering method may be performed by adaptively changing a filter structure. For example, switching between filter support areas may be possible, or the filter support areas may have different filter tap lengths horizontally and vertically.

Next-generation video content is likely to feature high spatial-resolution, a high frame rate, and a high dimensionality of scene representation. The processing of such video content would require a significant increase in memory storage, memory access rates, and processing power.

In contrast, such a high sampling rate may lead to a problem of oversampling in specific content. For example, video may be represented with a lower sampling rate without a loss in the quality of reconstructed data. Moreover, the application of a complex model to very simple signals may lead to the introduction of a noise component and processing artifact as well as a loss of compression efficiency.

Accordingly, in order for next-generation video applications to have a reasonable computation cost, a video coding system needs to be designed using a multi-rate signal processing method.

For example, the multi-rate signal processing method may use sampling rate conversion. Such a method may be applied to a system having different input/output sampling rates.

Such sampling rate conversion may be used to solve a complicated multi-variable optimization problem, but in a video signal, such an approach may not be preferred due to complexity that varies spatiotemporally.

Accordingly, if locally adaptive sampling is used in processing video content, computation resources can be reduced, which allows a more efficient compression tool to be designed.

For example, the adaptive partitioning of a coded picture may be used in non-overlapping picture frames (or blocks). Such adaptive partitioning includes performing basic analysis on coded video data and selecting the sampling of coding mode. For example, large block sizes may be used to code a low complexity signal, and small block sizes may be used to code a high complexity signal. Furthermore, in the case of major video coding tools (e.g., MC prediction, transform, and signaling), partitioning in different block sizes may be defined. The blocks may accompany respective coding parameters (e.g., "mv" and "refidx").

However, most of coding tools, including interpolation, in-loop filtering (e.g., a deblocking filter and a sampling-adaptive offset), and intra-prediction mode, do not have an advantage from the available estimates of local signal complexity of a coded signal because they are not affected by a selected block partition size.

Accordingly, the present invention proposes a method using locally adaptive sampling in video coding. More specifically, embodiments using locally adaptive sampling in interpolation filtering step are described below.

FIG. 1 is a schematic block diagram of an encoder in which encoding is performed on a video signal in accordance with an embodiment to which the present invention is applied.

Referring to FIG. 1, the encoder 100 includes a transform unit 120, a quantization unit 125, a dequantization unit 130, an inverse transform unit 135, a filtering unit 140, a Decoded Picture Buffer (DPB) unit 150, an inter-prediction unit 160, an intra-prediction unit 165, and an entropy encoding unit 170. And, the filtering unit 140 includes a picture property checking unit, an adaptive sampling unit and a filtering execution unit.

The encoder 100 receives an input video signal and generates a residual signal by subtracting a prediction signal, output by the inter-prediction unit 160 or the intra-prediction unit 165, from the input video signal. The generated residual signal is sent to the transform unit 120, and the transform unit 120 generates a transform coefficient by applying a transform scheme to the residual signal.

The quantization unit 125 quantizes the generated transform coefficient and sends the quantized coefficient to the entropy encoding unit 170. The entropy encoding unit 170 performs entropy coding on the quantized signal and outputs the resulting signal.

The quantized signal output by the quantization unit 120 may be used to generate the prediction signal. For example, the residual signal may be reconstructed by applying dequantization and inverse transform to the quantized signal through the dequantization unit 130 and the inverse transform unit 135 within the loop. A reconstructed signal may be generated by adding the reconstructed residual signal to the prediction signal output by the inter-prediction unit 160 or the intra-prediction unit 165.

In such a compression process, an artifact in which a block boundary appears may occur because neighboring blocks are quantized by different quantization parameters. Such a phenomenon is called a blocking artifact, which is one of factors that may be used for people to evaluate picture quality. In order to reduce such an artifact, a filtering process may be performed. A blocking artifact can be removed through such a filtering process, and thus picture quality can be improved because an error in a current frame is reduced.

The filtering basically includes in-loop filtering and post filtering. The post filtering does not have an influence on an image decoding process and may be selectively used in a display device or by a user. Accordingly, a detailed description of the post filtering is omitted in this specification. The in-loop filtering is described with reference to the filtering unit 140. The filtering unit 140 may perform deblocking filtering or sampling-adaptive offset filtering or may perform both the deblocking filtering and the sampling-adaptive offset filtering.

The filtering unit 140 applies filtering to the reconstructed signal and outputs the filtered signal to a playback device or sends the filtered signal to the DPB unit 150. The filtered signal sent to the DPB unit 150 may be used as a reference frame in the inter-prediction unit 160. Both picture quality and coding efficiency can be improved using the filtered frame as a reference frame in inter-prediction mode as described above. In this case, a filtering computation process is complicated, and frequent memory access is caused because the filtering unit 140 has to load reconstructed samples stored in memory and to store the filtered samples in the memory again in order to perform filtering. As a result, the complexity of a decoder is increased. Accordingly, in an embodiment of the present invention, a coding tool capable of reducing the complexity of the decoder is designed. More specifically, the present invention may lead to reduction in required computation resources by applying locally adaptive sampling in the filtering process.

The DPB unit 150 may store the filtered frame in order to use the filtered frame as a reference frame in the inter-prediction unit 160.

The inter-prediction unit 160 performs temporal prediction and/or spatial prediction with reference to a reconstructed picture in order to remove temporal redundancy and/or spatial redundancy. In this case, a reference picture used to perform prediction may include a blocking artifact or a ringing artifact because it is a signal that has been quantized or dequantized in a block unit when the reference picture is previously coded or decoded.

Accordingly, in order to solve the discontinuity of such a signal or performance deterioration of attributable to the quantization of the signal, the inter-prediction unit 160 may interpolate a signal between pixels in a sub-pixel unit using a low-pass filter. In this case, the sub-pixel means a virtual pixel generated by applying an interpolation filter to the sub-pixel, and an integer pixel means an actual pixel present in a reconstructed picture. An interpolation method may include linear interpolation, bi-linear interpolation, and a wiener filter.

The interpolation filter may be applied to a reconstructed picture in order to improve the precision of prediction. For example, the inter-prediction unit 160 may generate interpolation pixels by applying the interpolation filter to integer pixels and perform prediction using an interpolated block formed of the interpolated pixels as a prediction block. An embodiment of the present invention provides a locally adaptive sampling method in interpolation filtering process. In this case, samples used for interpolation filtering may be accessed through an adaptive sampling grid that may be derived based on the properties (e.g., a block size and picture parameters) of a coded picture. The adaptive sampling grid may be determined based on an adaptive sampling rate or an adaptive sampling pattern.

Furthermore, in an embodiment of the present invention, interpolation filtering may be performed using pixels to which the adaptive sampling rate or the adaptive sampling pattern has been applied. In this case, the adaptive sampling rate or the adaptive sampling pattern may include at least one of a uniform sampling rate, a reduced sampling rate, and a variable sampling rate within a filter support area. Furthermore, an embodiment of the present invention may provide a 2D interpolation filtering method having different filter support areas and a 2D interpolation filtering method having different sampling rates.

The intra-prediction unit 165 predicts a current block with reference to samples that neighbor a block to be now coded. The intra-prediction unit 165 may perform the following process in order to perform intra-prediction. First, a reference sample required to generate a prediction signal may be prepared. Furthermore, a prediction signal may be generated using the prepared reference sample. Thereafter, a prediction mode is coded. In this case, the reference sample may be prepared the padding of the reference sample and/or the filtering of the reference sample. The reference sample may include a quantization error because it has experienced prediction and reconstruction processes. Accordingly, in order to reduce such an error, a reference sample filtering process may be performed on each prediction mode used in intra-prediction.

An embodiment of the present invention provides an adaptive sampling method in a reference sample filtering process. In this case, samples used for such reference sample filtering may be accessed through an adaptive sampling grid. The adaptive sampling grid may be derived based on the properties (e.g., a block size and picture parameters) of a coded picture. The adaptive sampling grid may be determined based on an adaptive sampling rate or an adaptive sampling pattern. The adaptive sampling method applied to the reference sample filtering process may also be applied to other embodiments described in this specification.

A prediction signal generated through the inter-prediction unit 160 or the intra-prediction unit 165 may be used to generate a reconstructed signal or may be used to generate a difference signal.

The embodiments are described in more detail below.

FIG. 2 illustrates a schematic block diagram of a decoder configured to decode a video signal in an embodiment to which the present invention is applied.

The decoder 200 of FIG. 2 includes an entropy decoding unit 210, a dequantization unit 220, an inverse transform unit 225, a filtering unit 230, a DPB unit 240, an inter-prediction unit 250, and an intra-prediction unit 255. Furthermore, a reconstructed signal output through the decoder 200 may be displayed on a display. And, the filtering unit 230 includes a picture property checking unit, an adaptive sampling unit and a filtering execution unit.

The decoder 200 receives a signal output by the encoder 100 of FIG. 1. The received signal is subjected to entropy decoding through the entropy decoding unit 210. The dequantization unit 220 obtains a transform coefficient from the entropy-decoded signal using information about a quantization step size. The inverse transform unit 225 obtains a difference signal by inversely transforming the transform coefficient. A reconstructed signal is generated by adding the obtained difference signal to a prediction signal output by the inter-prediction unit 250 or the intra-prediction unit 255.

The filtering unit 230 applies filtering to the reconstructed signal and outputs the filtered signal to a playback device or the DPB unit 240. The filtered signal transmitted by the DPB unit 240 may be used as a reference frame in the inter-prediction unit 250.

In this specification, the embodiments described with reference to the filtering unit 140, the inter-prediction unit 160, and the intra-prediction unit 165 of the encoder may also be identically applied to the filtering unit 240, the inter-prediction unit 250, and the intra-prediction unit 255 of the decoder, respectively.

Furthermore, the present invention may be applied to a unit that requires an interpolation filtering in a process of encoding or decoding a video signal.

For example, at least one of the filtering unit 140/230, the inter-prediction unit 160/250, or the intra-prediction unit 165/255 may include a filtering execution unit, and the filtering execution unit may include an interpolation filter.

Figure 3:
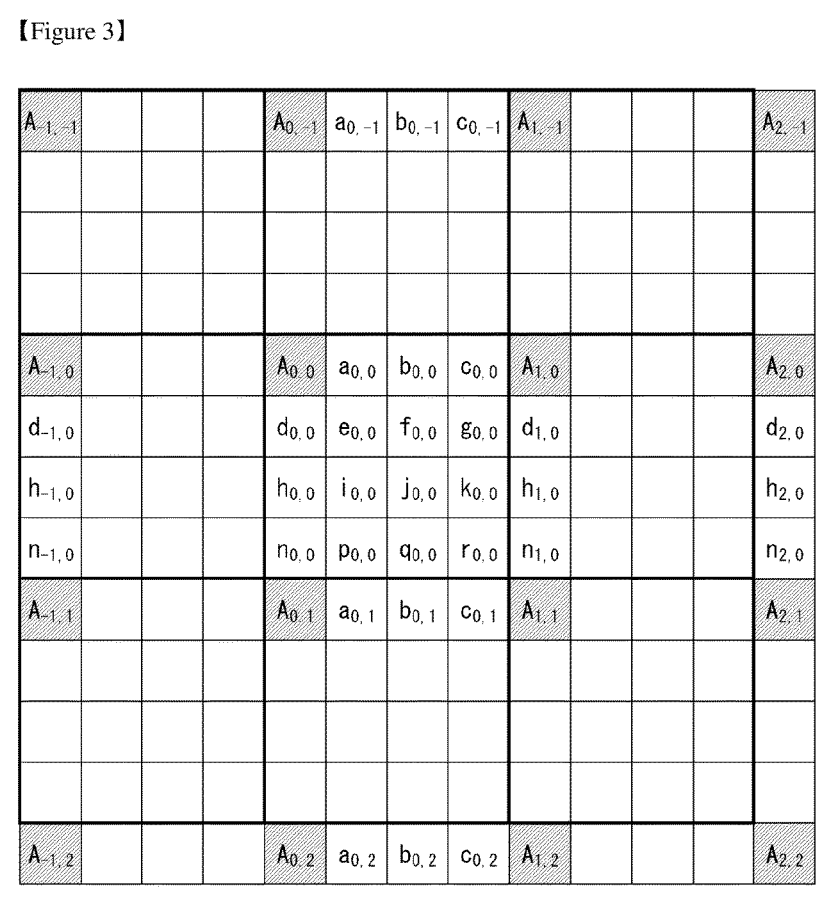

FIG. 3 schematically illustrates the relationship between the positions of samples within a block which is used to perform interpolation filtering in an embodiment to which the present invention is applied.

Referring to FIG. 3, a capital letter A is indicative of the position of an integer sample placed in an integer pixel grid. Small letters a, b, c, d, e, f, g, h, i, j, k, n, p, q, and r are indicative of the positions of interpolation samples placed in integer pixel grids. The interpolation sample may be indicated on a sub-pixel grid. For example, it is assumed that "a" is placed at a distance of ¼ from A and "b" and "c" are placed at respective distances of ½ and ¾ from A. "a", "b", and "c" are indicative of the 1D positions of samples that have been interpolated in a horizontal direction. "d", "h", and "n" are indicative of the 1D positions of samples that have been interpolated in a vertical direction. "e", "f", "g", "i", "j", "k", "p", "q", and "r" are indicative of the 2D positions of samples that have been interpolated in horizontal/vertical directions.

Furthermore, with respect to a subscript (i, j), the position of a sample on the left of (0,0) horizontally may be indicated by (−1, 0) and the position of a sample on the right of (0,0) horizontally may be indicated by (1, 0). Furthermore, the position of a sample at the top of (0,0) vertically may be indicated by (0, −1), and the position of a sample at the bottom of (0,0) vertically may be indicated by (0, 1). For example, the position of a sample on the left of a sample $A_{0,0}$ may be indicated by $A_{-1,0}$, the position of a sample on the right of the sample $A_{0,0}$ may be indicated by $A_{1,0}$, the position of a sample at the top of the sample $A_{0,0}$ may be indicated by $A_{0,-1}$, and the position of a sample at the bottom of the sample $A_{0,0}$ may be indicated by $A_{0,1}$. The same principle may be applied to the interpolation sample.

FIG. 3 has been illustrated based on a ¼ pixel grid, but the present invention may be applied to a variety of types of grids with pixel precision.

In an embodiment to which the present invention is applied, in order to obtain a motion vector of a sub-pixel unit, samples at sub-pixel position within a reconstructed picture need to be computed through interpolation filtering. A filtering process may be performed through a two-step Finite Impulse Response (FIR) process. In this case, an 8-tap filter may be applied to a sample at a ½ sub-pixel position on a pixel grid, and a 7-tap filter may be applied to a sample at a ¼ sub-pixel position on the pixel grid. For example, Equation 1 below may be provided as a filter coefficient for the interpolating a sample at a sub-pixel position.

$$HaF = [-1 \; 4 \; -11 \; 40 \; 40 \; -11 \; 4 \; 1]$$

$$QuF = [-1 \; 4 \; -10 \; 58 \; 17 \; -5 \; 1] \quad \text{[Equation 1]}$$

In this case, HaF denotes an FIR filter applied to samples at ½ positions on a pixel grid, and QuF denotes an FIR filter applied to samples at ¼ positions on the pixel grid.

Luma samples allocated to the integer pixel grid of a decoded picture may be computed based on sub-pixel positions as in Equation 2 below.

$$a = \sum_{i=0}^{6} QuF_i * x_{3,i} \quad \text{[Equation 2]}$$

$$b = \sum_{i=0}^{7} HaF_i * x_{3,i}$$

$$c = \sum_{i=0}^{6} QuF_{6-i} * x_{3,7-i}$$

$$d = \sum_{i=0}^{6} QuF_i * x_{i,3}$$

$$h = \sum_{i=0}^{6} HaF_i * x_{i,3}$$

$$n = \sum_{i=0}^{6} QuF_{6-i} * x_{7-i,3}$$

A luma sample placed at a fraction pixel position and luma samples not allocated to an integer pixel grid may be computed through separate 2D filtering as in Equation 3 below.

$$e = \left( \sum_{j=0}^{6} QuF_j * \sum_{i=0}^{6} QuF_i * x_{j,i} \right) \gg 6 \quad \text{[Equation 3]}$$

$$f = \left( \sum_{j=0}^{6} QuF_j * \sum_{i=0}^{7} HaF_i * x_{j,i} \right) \gg 6$$

$$g = \left( \sum_{j=0}^{6} QuF_j * \sum_{i=0}^{6} QuH_{6-j} * x_{j,7-i} \right) \gg 6$$

$$i = \left( \sum_{j=0}^{7} HaF_j * \sum_{i=0}^{6} QuF_i * x_{j,i} \right) \gg 6$$

$$j = \left( \sum_{j=0}^{7} HaF_j * \sum_{i=0}^{7} HaF_i * x_{j,i} \right) \gg 6$$

$$k = \left( \sum_{j=0}^{7} HaF_j * \sum_{i=0}^{6} QuH_{6-j} * x_{j,7-i} \right) \gg 6$$

$$p = \left( \sum_{j=0}^{6} QuF_{6-j} * \sum_{i=0}^{6} QuF_i * x_{7-j,i} \right) \gg 6$$

-continued $$q = \left( \sum_{j=0}^{6} QuF_{6-j} * \sum_{i=0}^{7} HaF_i * x_{7-j,i} \right) \gg 6$$

$$r = \left( \sum_{j=0}^{6} QuF_{6-j} * \sum_{i=0}^{6} QuF_{6-j} * x_{7-j,7-i} \right) \gg 6$$

FIG. 4 is a flowchart illustrating a method of performing interpolation filtering to which adaptive sampling is applied in an embodiment to which the present invention is applied.

First, an adaptive sampling rate may be determined based on information about the properties of a decoded picture at sep S410. In this case, the adaptive sampling rate may correspond to at least one of a uniform sampling rate, a reduced sampling rate, and a variable sampling rate.

Furthermore, interpolation filtering may be performed using samples to which the adaptive sampling rate has been applied at sep S420.

For example, if the adaptive sampling rate corresponds to the reduced sampling rate, the interpolation filtering may be performed based on the reduced tap length of a filter support area.

For another example, if the adaptive sampling rate corresponds to the variable sampling rate, the interpolation filtering may be performed using different sampling rates. For example, all the three sampling rates may be applied to first N taps, and the reduced sampling rate may be applied to next M taps.

FIG. 5 illustrates 1D interpolation filtering to which adaptive sampling is applied in an embodiment to which the present invention is applied.

In an embodiment of the present invention, there is introduced a locally adaptive sampling method within a filter support area in order to calculate a sample value at a sub-pixel position. A sampling rate or sampling pattern used to access samples on an integer pixel grid may be derived based on the properties (e.g., a partition or a block size and picture parameters) of a coded picture.

Referring to FIG. 5, white circles are indicative of interpolation samples placed in the integer pixel grid of an interpolated picture. The white circle may be used to compute the position of an interpolation-filtered sample masked with a black-crossed circle. The black-crossed circle is indicative of the position of an interpolation sample that has been subjected to 2D interpolation filtering. A solid-line rectangular block is indicative of a 1D filter support area in a horizontal direction.

The filter support area illustrated in FIG. 5 is only an embodiment, and it does not indicate all the filter support areas.

FIG. 5A illustrates 1D interpolation filtering to which a uniform sampling rate is applied.

For example, FIG. 5A illustrates that 1D filtering of a 7-tap length is performed on a filter support area at a uniform sampling rate. This may be represented as in Equation 4 below.

$$y = \sum_{i=0}^{N} HF_i * x_i \quad \text{[Equation 4]}$$

In Equation 4, a horizontal filter HF denotes the pulse response of an N tap filter, $X_i$ denotes an interpolation sample placed in an integer pixel grid, and y denotes an interpolation sample obtained through interpolation filtering.

FIG. 5B illustrates 1D interpolation filtering to which a reduced sampling rate is applied.

Referring to FIG. 5B, a reduced sampling rate may mean that a reduced tap length, for example, 4 taps instead of 7 taps are used within the same filter support area. Such an interpolation filter may be applied to a smooth picture fragment area having a tendency toward a slow change. This may be represented as in Equation 5 below.

$$y = \sum_{i=0}^{N} HF_i * x_{2*i}$$ [Equation 5]

FIG. 5C illustrates 1D interpolation filtering to which a variable sampling rate is applied.

From FIG. 5C, it may be seen that the variable sampling rate is applied within the same filter support area. For example, all the three sampling rates may be applied to first N taps, and a reduced sampling rate may be applied to next M taps while the filter support area is maintained.

The first N taps are applied to the samples of all the three sampling rates, and the next M taps are applied to the samples of the reduced sampling rate. This may be represented as in Equation 6 below.

$$y = \sum_{i=0}^{N} HF_i * x_i + \sum_{i=0}^{M} HF_{N+i} * x_{N+2*i}$$ [Equation 6]

Such an interpolation filter may be used when filtering is performed on an object edge or an edge placed in a background. In the case of FIG. 5C, first N taps may be applied to a signal having a complicated structure, and next M taps may be applied to a signal having a less complicated structure.

FIG. 6 illustrates a signal and response characteristics for illustrating filtering to which adaptive sampling is applied in an embodiment to which the present invention is applied. FIG. 6A illustrates the response characteristics of an FIR filter, FIG. 6B illustrates the characteristics of a 1D signal, and FIG. 6C illustrates the response characteristics of an FIR filter to which adaptive sampling has been applied.

Referring to FIG. 6A, the response of an FIR filter may be represented as in Equation 7 below.

$$HF=[12, -43, 159, 159, -43, 12]/256$$ [Equation 7]

Filter coefficients in Equation 7 indicate that they have been non-normalized by 256 factors, for convenience of description.

FIG. 6B illustrates the characteristics of the respective sample positions of an input signal. This may be represented as Equation 8 below.

$$x=[140, 85, 142, 128, 128, 128]$$ [Equation 8]

From FIG. 6B, it may be seen that the characteristics of the input signal that appear in samples 1, 2, and 3 are different from those appearing in samples 4, 5, and 6. That is, a lower sampling rate may be applied to the samples 4, 5, and 6 because a change of the signal is small in the samples 4, 5, and 6. Accordingly, an adaptive filter response $HF_{SA}$ may be obtained as in Equation 9 below.

$$HF_{SA}=[12, -43, 159, 0, 128, 0]/256$$ [Equation 9]

A filtering process in Equation 6 may be performed as in Equation 10 below.

$$y=HF_1*x_1+HF_2*x_2+HF_3*x_3+HF_5*x_5$$ [Equation 10]

Furthermore, in the embodiment of Equation 10, the same filter response may be obtained although the convolution ($HF*HF_{SA}$) of two filters is applied to the input signal "x".

In another embodiment to which the present invention is applied, the impulse response of a filter aimed at different sampling rates may be previously defined. Such an example may include a deblocking filter. In general, the deblocking filter may be applied to a block boundary. For example, half the impulse response may be applied to a block A, and the other half may be applied to a block B.

In another embodiment to which the present invention is applied, a filter impulse response aimed at different sampling rates with respect to filter support areas may be computed based on signal parameters or syntax elements. For example, in the case of a signal having various characteristics for filter taps, different sampling rates may be applied to filter support areas.

In another embodiment to which the present invention is applied, a filter response may be derived based on the value of a filtered sample or the values of samples that neighbor each other spatiotemporally.

FIG. 7 illustrates syntax for deriving an adaptive filter based on information about a spatial variance of a coded signal in an embodiment to which the present invention is applied.

A filter response may be obtained based on syntax elements extracted from a bit stream. For example, adaptive filtering may be performed based on information indicative of information about a spatial variance of a coded signal. For example, coded_sub_block_flag, LastSignificantCoeffX, and LastSignificantCoeffY may be used.

Referring to FIG. 7, first, if a current prediction mode is an intra mode and an intra-prediction mode is 1 at step S710, coded_sub_block_flag may be checked. In this case, coded_sub_block_flag is a flag used to obtain information related to the transform coefficient level of a sub-block at a position (xS, yS) within the current transform block.

If coded_sub_block_flag is equal to 0 for all the (xS, yS) !=(0,0) at step S720, the values of LastSignificantCoeffX and LastSignificantCoeffY may be checked.

In this case, if (LastSignificantCoeffX, LastSignificantCoeffY) is equal to (0,0) at step S730, a filter on which adaptive sampling has been applied, such as Equation 9, may be used at step S740.

If the (LastSignificantCoeffX, LastSignificantCoeffY) is not equal to (0,0) at step S750, a filter, such as Equation 7, may be used at step S760.

FIG. 8 illustrates syntax for deriving an adaptive filter based on a transform coefficient in an embodiment to which the present invention is applied.

A filter response may be obtained based on syntax elements extracted from a bit stream and a decoded or derived transform coefficient value of a transform unit placed at a block boundary. For example, coded_sub_block_flag and transformBlock[j][i] may be used.

Referring to FIG. 8, first, if a current prediction mode is an intra mode and an intra-prediction mode is 1 at step S810, coded_sub_block_flag may be checked. In this case, coded_sub_block_flag is a flag used to obtain information related to the transform coefficient level of a sub-block at a position (xS, yS) within the current transform block.

If coded_sub_block_flag is equal to 0 for all the (xS, yS) !=(0,0) at step S820, the value of transformBlock[j][i] may be checked.

In this case, if transformBlock[j][i] is equal to 0 for all the (j, !=(0,0) at step S830, a filter on which adaptive sampling has been applied, such as Equation 9, may be used at step S840.

If transformBlock[j][i] is not equal to 0 for all the (j, !=(0,0) at step S850, a filter, such as Equation 7, may be used at step S860.

FIG. 9 is a flowchart illustrating a method of performing 2D interpolation filtering to which different Rate Parameter (RP) values are applied in an embodiment to which the present invention is applied.

First, an adaptive sampling rate may be determined based on information about the properties of a decoded picture at step S910. In this case, the adaptive sampling rate may correspond to at least one of a uniform sampling rate, a reduced sampling rate, and a variable sampling rate.

Furthermore, first interpolation filtering may be performed using samples to which the adaptive sampling rate has been applied at step S920.

For example, if the adaptive sampling rate corresponds to the reduced sampling rate, the interpolation filtering may be performed based on the reduced tap length of a filter support area.

For another example, if the adaptive sampling rate corresponds to the variable sampling rate, the interpolation filtering may be performed using different sampling rates. For example, all the three sampling rates may be applied to first N taps, and the reduced sampling rate may be applied to next M taps.

Thereafter, second interpolation filtering may be performed using samples to which the first interpolation filtering has been applied at step S930. For example, the first interpolation filtering may be interpolation filtering in a horizontal direction, and the second interpolation filtering may be interpolation filtering in a vertical direction.

FIG. 10 illustrates 2D interpolation filtering to which different RP values are applied in an embodiment to which the present invention is applied.

An embodiment of the present invention provides a locally adaptive sampling method within a filter support area in order to calculate sample values at sub-pixel positions. A sampling rate or sampling pattern used to access samples on an integer pixel grid may be derived based on the properties (e.g., a partition or a block size and picture parameters) of a coded picture.

Referring to FIG. 10, white circles are indicative of interpolation samples placed in the integer pixel grid of an interpolated picture. The white circle may be used to compute the position of an interpolation-filtered sample masked with a black-crossed circle. The black-crossed circle is indicative of the position of an interpolation sample that has been subjected to 2D interpolation filtering. A solid-line rectangular block is indicative of a 1D filter support area in a horizontal direction, and a dotted-line rectangular block is indicative of a 1D filter support area in a vertical direction with respect to interpolation samples obtained from the first interpolation filtering in the horizontal direction. The filter support area illustrated in FIG. 10 is only an embodiment, and it does not indicate all the filter support areas.

FIGS. 10 and 11 illustrate interpolation embodiments using two types of separate 2D filtering. The two types of separate 2D filtering may be performed using a two-step approach method. In the first step, N-tap filtering may be performed on samples within a filter support area (i.e., the solid-line rectangular block) in a horizontal direction. The filtered samples may be used to compute interpolation samples in a vertical direction.

In the second step, M-tap filtering may be performed on interpolation samples within a filter support area (i.e., the dotted-line rectangular block) in a vertical direction. The filtered samples may be used to calculate the values of samples at pixel positions not present in the integer pixel grid.

In an embodiment of the present invention, samples in the original pixel grid may be accessed based on an adaptive sampling rate. For example, the adaptive sampling rate may be determined based on a Rate Conversion Parameter (hereinafter called "RP").

From FIG. 10, it may be seen that different sampling rates are horizontally applied in the same filter support area. For example, a filter having a 7-tap length may be applied to sample placed in the same horizontal direction, and a filter having a 4-tap length may be applied to the samples. This may be represented as in Equation 11 below.

$$y = \Sigma_{j=0}^{M} VF_h * (\Sigma_{i=0}^{N} HF_{j,\beta*i} * x_{j,\beta*i})$$ [Equation 11]

In Equation 11, $VF_j$ denotes a filter coefficient applied to filtering in a vertical direction, and $HF_{j,i}$ denotes a filter coefficient applied to filtering in a horizontal direction. "α" denotes the value of an RP in the vertical direction, and "β" denotes the value of an RP in the horizontal direction. Interpolation filtering to which Equation 11 is applied is applied to a 2D signal "x", and (j,i) denotes the spatial coordinates of a sample $X_{j,i}$. If filtering is performed in the vertical direction, an independent filter may be applied to each column.

FIG. 11 is a flowchart illustrating a method of performing 2D interpolation filtering to which different filter support areas are applied in an embodiment to which the present invention is applied.

An embodiment of the present invention provides an adaptive sampling method for performing interpolation filtering to which different filter support areas are applied.

First, an adaptive sampling rate may be determined based on information about the properties of a decoded picture at step S1110. In this case, the adaptive sampling rate may correspond to at least one of a uniform sampling rate, a reduced sampling rate, and a variable sampling rate.

Furthermore, first interpolation filtering may be performed using samples to which the adaptive sampling rate has been applied at step S1120. In this case, the first interpolation filtering may be performed on samples having different filter support areas in a horizontal direction. In this case, the filter support area may be determined based on a rate conversion parameter value. For example, the different filter support areas may be determined based on different rate conversion parameters.

Thereafter, second interpolation filtering may be performed using samples that belong to the samples to which the first interpolation filtering has been applied and that have different filter support areas at step S1130. In this case, the first interpolation filtering may be interpolation filtering in a horizontal direction, and the second interpolation filtering may be interpolation filtering in a vertical direction.

FIG. 12 illustrates 2D interpolation filtering to which different filter support areas are applied in an embodiment to which the present invention is applied.

FIG. 12 illustrates an embodiment in which 2D interpolation filtering to which different filter support areas are applied is performed.

Referring to FIG. 12, a white circle, a black-crossed circle, and a black circle are the same as those described with reference to FIG. 10. Furthermore, a solid-line rectangular block and a dotted-line rectangular block are also the same as those described with reference to FIG. 10. Likewise, the filter support areas illustrated in FIG. 12 are only embodiments, and they do not indicate all the filter support areas.

In an embodiment to which the present invention is applied, if different rate conversion parameter (RP) values are applied when samples are accessed, a filter support area can be efficiently changed. This may be represented as in Equation 12 below.

$$y = \sum_{j=0}^{M} VF_j * \left( \sum_{i=0}^{N} HF_{j,i} * x_{j,\beta*i} \right)$$ [Equation 12]

In Equation 12, $VF_j$ denotes a filter coefficient applied to filtering in a vertical direction, $HF_{j,i}$ denotes a filter coefficient applied to filtering in a horizontal direction, and $\beta$ denotes the value of an RP in the horizontal direction. Interpolation filtering to which Equation 12 is applied is applied to a 2D signal "x", and (j,i) denotes the spatial coordinates of a sample $X_{j,i}$. If filtering is applied in the vertical direction, an independent filter may be applied to each column.

FIGS. 13 and 14 illustrate 2D interpolation filtering to which a variable sampling rate is applied in embodiments to which the present invention is applied.

For a description of symbols illustrated in FIGS. 13 and 14, reference may be made to the description given with reference to FIG. 12.

In an embodiment of the present invention, there is introduced a locally adaptive sampling method within a filter support area in order to calculate the values of samples at sub-pixel positions. A sampling rate or sampling pattern used to access samples on an integer pixel grid may be derived based on the properties (e.g., a partition or a block size and picture parameters) of a coded picture.

Referring to FIGS. 13 and 14, an adaptive sampling rate to which the present invention is applied may be determined based on a distance function according to the position of an interpolation sample.

In other embodiments, FIGS. 13 and 14 illustrate 2D filtering to which a variable sampling rate has been applied. In this case, the variable sampling rate may be represented by a distance function according to the location of an interpolation pixel (indicated by a dark circle). This may be represented as in Equation 13 below.

$$y = \sum_{j=0}^{M} VF_j * \left( \sum_{i=0}^{N} HF_{j,i} * x_{\alpha*j,\beta*i} \right)$$ [Equation 13]

In Equation 13, $VF_j$ denotes a filter coefficient applied to filtering in a vertical direction, and $HF_{j,i}$ denotes a filter coefficient applied to filtering in a horizontal direction. "$\alpha$" denotes the value of an RP in the vertical direction, and "$\beta$" denotes the value of an RP in the horizontal direction. Interpolation filtering to which Equation 13 is applied is applied to a 2D signal "x", and (j,i) denotes the spatial coordinates of a sample $X_{j,i}$. If filtering is performed in the vertical direction, an independent filter may be applied to each column.

FIG. 15 illustrates 2D interpolation filtering to which a reduced sampling rate is applied in an embodiment to which the present invention is applied.

For a description of symbols illustrated in FIG. 15, reference may be made to the description given with reference to FIG. 12.

In an embodiment of the present invention, there is introduced a locally adaptive sampling method within a filter support area in order to calculate the values of samples at sub-pixel positions. Referring to FIG. 15, a reduced sampling rate may be applied in a horizontal direction.

First, an adaptive sampling rate may be determined based on information about the properties of a decoded picture. In this case, the adaptive sampling rate may be a reduced sampling rate. Furthermore, first interpolation filtering may be performed using samples on which the reduced sampling rate has been applied. Referring to FIG. 15, the first interpolation filtering may be performed on a filter support area based on a reduced tap length. Furthermore, the reduced tap length may be determined based on a rate conversion parameter (RP) value.

Thereafter, second interpolation filtering may be performed using samples on which the first interpolation filtering has been applied. In this case, adaptive sampling may be applied when the second interpolation filtering is performed. For example, the adaptive sampling may correspond to at least one of a uniform sampling rate, a reduced sampling rate, and a variable sampling rate.

As illustrated in FIG. 15, 2D filtering to which a reduced sampling rate has been applied in a horizontal direction may be represented as in Equation 14 below.

$$y = \sum_{j=0}^{M} VF_j * \left( \sum_{i=0}^{N} HF_{j,i} * x_{j,\beta*i} \right)$$ [Equation 14]

In Equation 14, $VF_j$ denotes a filter coefficient applied to filtering in a vertical direction, and $HF_{j,i}$ denotes a filter coefficient applied to filtering in a horizontal direction. $\beta$ denotes the value of an RP in the horizontal direction. Interpolation filtering to which Equation 14 is applied is applied to a 2D signal "x", and (j,i) denotes the spatial coordinates of a sample $X_{j,i}$. If filtering is applied in the vertical direction, an independent filter may be applied to each column.

In another embodiment, an adaptive sampling rate may be applied to filtering in a horizontal, vertical, or angular direction. For example, the direction applied in intra-prediction may be used.

In another embodiment, an adaptive sampling rate may be applied to filtering in a time direction. For example, the adaptive sampling rate may be applied to affine motion compensation or temporal up-sampling.

In another embodiment, the value of a rate conversion parameter (RP) applied in a horizontal, vertical, or angular direction or in the direction of a combination of them may be determined based on the local parameters of video signals of a decoded picture that neighbor each other spatiotemporally through the encoder and the decoder. For example, the local parameters may include block partitioning, a coding mode, motion information, a conversion type, and a decoded sample value.

In another embodiment, the same sampling rate may be applied to input data and a filter pulse response. In such a case, sparse filtering may be efficiently performed on the input data. Furthermore, a specific filtering coefficient may be set to 0.

In another embodiment, different sampling rates may be applied to input data and a filter pulse response. If the sampling rate of a filter is greater than that of input data, the filter support area of the input data may be increased. In contrast, if the sampling rate of a filter is smaller than that of input data, it may lead to a reduced filter support area for the input data.

In another embodiment, the pulse response of a filter may be weakened in order to satisfy the sampling rate of input data. For example, a window function may be applied to the pulse response through stretching, interpolation, and/or extrapolation.

In another embodiment, an adaptive pulse response function for a specific sampling rate may be derived by the decoder or the encoder through a specific process or syntax elements.

In another embodiment, interpolation filtering may include controlling the sampling rate of input data or a filter pulse response or controlling a filter support area in order to perform an analysis of neighboring spaces around an interpolated position and incorporate information about a locally complicated signal into the interpolation filtering.

In another embodiment, a variable sampling rate and/or a variable tap length/adaptive filtering coefficient may be applied to an adaptive filter based on the complexity measured value of a video signal.

FIG. 16 schematically illustrates location relationships between samples within a block used when filtering is performed in accordance with an embodiment to which the present invention is applied.

Deblocking filtering in video coding may be chiefly divided into an analysis stage and a filtering stage.

In the analysis stage, the coding artifacts of a decoded picture may be modeled through a parameter set that is related to a 1D representation of a finite tap-length and artifacts-feature estimation. For example, as illustrated in FIG. 16, four samples of each of a left block and a right block on the basis of the vertical boundary of the block may be used. Furthermore, determination in a sample data processing and artifacts modeling stage is performed based on a specific deblocking type and the parameter of a deblocking filter.

Blocking artifacts may occur in both a vertical edge and a horizontal edge. Thus, filtering may be first performed on a vertical edge that belongs to the block boundary of a picture that is now reconstructed in a horizontal direction, and filtering may be then performed on a horizontal edge that belongs to the block boundary of the picture that is now reconstructed. In this specification, embodiments in which filtering is horizontally performed on a vertical edge have been illustrated, but the embodiments may be likewise applied to the filtering of a horizontal edge. Order of such filtering is also not limited to the above examples.

Referring to FIG. 16, sample positions on the left side may be defined as p0, p1, p2, and p3, and sample positions on the right side may be defined as q0, q1, q2, and q3 on the basis of a vertical boundary. Furthermore, a sub-script denotes the row identifier of a sample. For example, the sample positions of a left block P in a first row may be defined as $p0_0$, $p1_0$, $p2_0$, and $p3_0$, and the sample positions of a right block Q may be defined as $q0_0$, $q1_0$, $q2_0$, and $q3_0$ (1610). Likewise, the sample positions of the left block P in a fourth row may be defined as $p0_3$, $p1_3$, $p2_3$, and $p3_3$, and the sample positions of the right block Q may be defined as $q0_3$, $q1_3$, $q2_3$, and $q3_3$ (1620).

The analysis stage is required to use various coding parameters, such as coding mode, a coded residual signal, motion information, and an actual sample at a block boundary.

The analysis stage can be considered as a complicated part of the deblocking filtering and requires access to various coding parameters such as coding modes (intra, or inter), coded residuals, motion information (motion vectors and reference index) as well as actual samples at the block boundary.

As some of such parameters are present at a block level, complexity of filtering would follow block partitioning used to code a current picture. An example of such processing may include the derivation of Boundary Strength (BS).

A less complex video signal would be represented with a larger block size and therefore less parameters to be fetched from memory and processed for deblocking. For example, simple content is likely to be coded with large blocks and complex content is likely to be coded with a large number of small blocks.

Accordingly, complexity of filtering can be reduced by applying locally adaptive sampling based on information about the partitioning and/or coding mode of each block rather than applying a fixed manner to all the blocks when filtering is performed.

FIG. 17 is a schematic internal block diagram of the filtering unit for performing locally adaptive sampling in accordance with an embodiment to which the present invention is applied.

The filtering unit 140, 230 includes a picture property checking unit 1710, an adaptive sampling unit 1720, and a filtering execution unit 1730.

The filtering unit 140, 230 may first perform filtering on vertical edges for each macro block in a horizontal direction and then perform filtering on horizontal edges in a vertical direction. In some embodiments, the filtering unit 140, 230 may perform filtering on the vertical edges of all the block boundaries of a picture that is now reconstructed in a picture unit and perform filtering on all the horizontal edges of all the block boundaries of the picture, but the present invention is not limited thereto.

First, the picture property checking unit 1710 may check the property information of a decoded picture. For example, the property information of the decoded picture may include a block size, a picture parameter, etc. The picture parameter may be information that is included in a bit stream and transmitted or may be information derived from by the decoder. However, the present invention is not limited thereto. For example, the property information of decoded data can be defined at different levels, e.g. SPS(Sequence Parameter Set), PPS (Picture Parameter Set), slice or LCU (Largest Coding Unit), etc. Accordingly, an adaptive sampling rate and/or an adaptive sampling pattern can be determined based on parameters being signaled or derived at different levels.

The adaptive sampling unit 1720 may determine an adaptive sampling rate and/or an adaptive sampling pattern based on the property information received from the picture property checking unit 1710.

For example, the adaptive sampling unit 1720 may determine an adaptive sampling rate and/or an adaptive sampling pattern based on the size of a left block and the size of a right block on the basis of a block boundary. For example, if the size of a left block is the same as that of a right block, the adaptive sampling unit 1720 may identically apply the adaptive sampling rate and/or the adaptive sampling pattern to the left block and the right block.

For another example, if the size of the left block is different from that of the right block, the adaptive sampling unit 1720 may differently apply the adaptive sampling rate and/or the adaptive sampling pattern to the left block and the right block. For example, the adaptive sampling unit 1720 may apply low frequency sampling on a block having a larger block size or may apply reduced sampling on a block having a larger block size.

Meanwhile, a location of a sample to be filtered may be addressed by a relative location for the left-most pixel of a right block on the basis of a block boundary. Furthermore, the adaptive sampling rate may be determined by scaling an offset with a rate conversion value, and the rate conversion value may be differently applied to the left block and the right block on the basis of the block boundary.

Furthermore, the location of the sample to be filtered may be additionally adjusted based on a sub-rate conversion offset value.

The filtering execution unit 1730 may perform filtering by applying an adaptive sampling rate and/or an adaptive sampling pattern determined by the adaptive sampling unit 1720. That is, the filtering execution unit 1730 may perform filtering using a sample to which the adaptive sampling rate and/or the adaptive sampling pattern has been applied.

FIGS. 18 and 19 are embodiments to which the present invention is applied, wherein FIG. 18 is a flowchart illustrating a method of performing locally adaptive sampling and FIG. 19 is a flowchart illustrating a method of performing filtering using locally adaptive sampling.

In an embodiment of the present invention, in order to determine whether or not to perform filtering, first, the property information of a decoded picture may be checked at step S1810.

For example, the property information of the decoded picture may include at least one of a coding block size, a prediction block size, a transform block size, a partitioned block size, coding mode, and a coding parameter.

An adaptive sampling rate and/or an adaptive sampling pattern may be determined based on the checked property information of the decoded picture at step S1820.

For example, the adaptive sampling rate and/or the adaptive sampling pattern may be determined based on the size of a left block and the size of a right block on the basis of a block boundary. If the size of the left block is the same as that of the right block, the adaptive sampling rate and/or the adaptive sampling pattern may be identically applied to the left block and the right block.

If the size of the left block is different from that of the right block, the adaptive sampling rate and/or the adaptive sampling pattern may be differently applied to the left block and the right block. For example, low frequency sampling may be applied to a block having a larger block size, or reduced sampling may be applied to a block having a larger block size.

After the adaptive sampling rate and/or the adaptive sampling pattern are determined as described above, filtering may be performed using a sample to which the adaptive sampling rate and/or the adaptive sampling pattern has been applied at step S1830.

For example, referring to FIG. 19, when a sample to be filtered is determined by applying an adaptive sampling rate and/or an adaptive sampling pattern at step S1910, an offset value may be calculated by applying a finite impulse response (FIR) filter to the sample at step S1920. In this case, a sample value may be replaced with the calculated offset value at step S1930.

Furthermore, the value of the filtered sample may be obtained at step S1950 by applying a clipping function to the calculated offset value at step S1940.

FIGS. 20 to 22 are diagrams illustrating that an adaptive sampling rate is determined based on the property information of a decoded picture in accordance with embodiments to which the present invention is applied.

The present invention proposes a local adaptive sampling method in a filtering stage. The local adaptive sampling method may be determined based on the property information of a decoded picture. For example, an adaptive sampling rate and/or an adaptive sampling pattern may be determined depending on the size of a left block and the size of a right block on the basis of a block boundary. In this case, the adaptive sampling rate and/or the adaptive sampling pattern may be defined by at least one of the number of samples and the interval between samples.

In the embodiment of FIG. 20, if the size of a left block P is the same as that of a right block Q, the adaptive sampling rate and/or the adaptive sampling pattern may be identically applied to the left block P and the right block Q.

Referring to FIG. 20, if the sizes of neighboring blocks on the basis of a block boundary are the same, the number of samples used within the left block P may be the same as that used within the right block Q. Furthermore, the interval between samples used within the left block P may be the same as the interval between samples used within the right block Q.

In the embodiments of FIGS. 21 and 22, if the size of a left block P is not the same as that of a right block Q, the adaptive sampling rate and/or the adaptive sampling pattern may be differently applied to the left block P and the right block Q.

Referring to FIG. 21, if the size of the left block P is larger than that of the right block Q, relative low frequency sampling may be applied to the left block P. In this case, the low frequency sampling may be determined based on complexity estimates of video signal undergoing coding. And, the low frequency sampling may be randomly determined or may be applied based on a relative size of a block.

For example, in FIG. 21, if the size of the left block P is 32×32 and the size of the right block Q is 16×16, the interval between samples of the left block P to be filtered may be twice the interval between samples of the right block Q to be filtered, and the number of samples of the left block P to be filtered and the number of samples of the right block Q to be filtered may be the same, that is, 4.

Referring to FIG. 22, if the size of the left block P is larger than that of the right block Q, relatively reduced sampling may be applied to the left block P. In this case, the reduced sampling may be determined based on complexity estimates of video signal undergoing coding. And, the reduced sampling may be randomly determined or may be applied based on a relative size of a block.

For example, in FIG. 22, if the size of the left block P is 32×32 and the size of the right block Q is 16×16, the number of samples of the left block P to be filtered may be ½ of the number of samples of the right block Q to be filtered, and the interval between the samples of the left block P to be filtered may be four times the interval between the samples of the right block Q to be filtered. That is, the number of samples of the left block P to be filtered may be two, that is, p0 and p2, and the number of samples of the right block Q to be filtered may be four, that is, q0, q1, q2, and q3.

FIG. 23 is a diagram illustrating a method of performing filtering using locally adaptive sampling in accordance with an embodiment to which the present invention is applied.

Referring to FIG. 23, it is assumed that sample positions on the left side are p0, p1, p2, and p3 and sample positions on the right side are q0, q1, q2, and q3 on the basis of a vertical boundary, and d0, d1, d2, d3, d4, and d5 are offset values that replace pixel values placed at corresponding sample positions. For example, in FIG. 23, the offset values d0, d1, and d2 may replace respective pixel values I(p2), I(p1), and I(p0) placed at the sample positions p2, p1, p0 of the left block P, and the offset values d3, d4, and d5 may replace respective pixel values I(q0), I(q1), and I(q2) placed at the sample positions q0, q1, and q2 of the right block Q (2300).

The offset values d0, d1, d2, d3, d4, and d5 may be calculated by applying a finite impulse response (FIR) filter, such as that of Equation 15 below.

$d0=((2*I(p3)+3*I(p2)+I(p1)+I(p0)+I(q0)+4)>>3);$ $d1=((I(p2)+I(p2)+I(p3)+I(p4)+2)>>2);$ $d2=((I(p2)+2*I(p1)+2*I(p0)+2*I(q0)+I(q1)+4)>>3);$ $d3=((I(p1)+2*I(p0)+2*I(q0)+2*I(q1)+I(q2)+4)>>3);$ $d4=((I(p0)+I(q0)+I(q1)+I(q2)+2)>>2);$ $d5=((I(p0)+I(q0)+*I(q1)+3*I(q2)+2*I(q3)+4)>>3);$ [Equation 15]

The finite impulse response (FIR) filter applied in Equation 15 is only an embodiment, and the present invention is not limited thereto.

If the offset values d0~d5 are calculated using Equation 15, a clipping function, such as that of Equation 16, may be applied in order to replace corresponding sample positions p2~p0, q0~q2.

$I(p2)=Clip3(A,A',d0);$ $I(p1)=Clip3(B,B',d1);$ $I(p0)=Clip3(C,C',d2);$ $I(q0)=Clip3(D,D',d3);$ $I(q1)=Clip3(E,E',d4);$ $I(q2)=Clip3(F,F',d5);$ [Equation 16]

In this case, A~F and A'~F' are indicative of the upper and lower dynamical range boundaries of the samples p3~q3. That is, the offset values d0~d5 converge within a range that include A and A', B and B', . . . , F and F', respectively. In such a case, the ranges of sample values replaced by filtering are limited to the upper limit values A~F and the lower limit values A'~F'. The upper limit values A~F and the lower limit values A'~F' may be determined based on the quantization parameters of the left block P and the right block Q. For example, if the quantization parameter has a great value, ranges determined by the upper limit values A~F and the lower limit values A'~F' may be increased.

Meanwhile, the sample positions p3~q3 may be determined by relative locations on the basis of the block boundary. For example, the sample positions p3~q3 may be addressed by a relative location for the left-most pixel of the right block Q on the basis of the block boundary. The spatial sample positions p3~q3 may be sequentially identified using the left-most pixel of the right block Q as a reference location.

Assuming a row of a decoded picture is represented as "piSrc", the left-most pixel of the right block Q is given as "piSrc[0]". If an offset indicative of the original pixel grid is 1, the sample positions p3~q3 may be given as follows.

$p3=piSrc[-Offset*4];$ $p2=piSrc[-Offset*3];$ $p1=piSrc[-Offset*2];$ $p0=piSrc[-Offset];$ $q0=piSrc[0];$ $q1=piSrc[Offset];$ $q2=piSrc[Offset*2];$ $q3=piSrc[Offset*3];$ [Equation 17]

In some embodiments of the present invention, the sample positions p3~q3 may be addressed at a locally adaptive sampling rate. For example, the locally adaptive sampling rate may be performed by scaling the offset value with a rate conversion (RP) value as in Equation 18 below.

$p3=piSrc[-Offset*RP*4];$ $p2=piSrc[-Offset*RP*3];$ $p1=piSrc[-Offset*RP*2];$ $p0=piSrc[-Offset*RP];$ $q0=piSrc[0];$ $q1=piSrc[Offset*RP];$ $q2=piSrc[Offset*RP*2];$ $q3=piSrc[Offset*RP*3];$ [Equation 18]

In Equation 18, RP denotes a rate conversion value.

In some embodiments of the present invention, different RP values may be applied to the left block P and the right block Q on the basis of the block boundary. For example, a rate conversion value applied to the left block P may be defined as a RPL (left) scaling factor, and a rate conversion value applied to the right block Q may be defined as an RPR (right) scaling factor. In this case, the sample positions p3~q3 may be given as in Equation 19 below.

$p3=piSrc[-Offset*RPL*4];$ $p2=piSrc[-Offset*RPL*3];$ $p1=piSrc[-Offset*RPL*2];$ $p0=piSrc[-Offset*RPL];$ $q0=piSrc[0];$ $q1=piSrc[Offset*RPR];$ $q2=piSrc[Offset*RPR*2];$ $q3=piSrc[Offset*RPR*3];$ [Equation 19]

In accordance with another embodiment of the present invention, a sample position may be additionally refined based on a sub-rate conversion offset value. For example, a sample position may be additionally adjusted precisely by scaling the offset value with a rate conversion value and then adding a sub-rate conversion offset value. In this case, the sample positions p3~q3 may be given as in Equation 20 below.

$$p3 = piSrc[-\text{Offset}*RPL*4+subRPL];$$

$$p2 = piSrc[-\text{Offset}*RPL*3+subRPL];$$

$$p1 = piSrc[-\text{Offset}*RPL*2+subRPL];$$

$$p0 = piSrc[-\text{Offset}*RPL+subRPL];$$

$$q0 = piSrc[0+subRPR];$$

$$q1 = piSrc[\text{Offset}*RPR+subRPR];$$

$$q2 = piSrc[\text{Offset}*RPR*2+subRPR];$$

$$q3 = piSrc[\text{Offset}*RPR*3+subRPR]; \quad [\text{Equation 20}]$$

In Equation 20, "subRPL" is indicative of a sub-rate conversion offset value applied to the left block P, and "subRPR" is indicative of a sub-rate conversion offset value applied to the right block Q.

FIG. 24 illustrates various examples in which a sampling is performed using a rate conversion value and a sub-rate conversion offset value in accordance with an embodiment to which the present invention is applied.

FIG. 24(a) illustrates an example in which RPL=2, sub-RPL=0, RPR=2, and subRPR=0. That is, the present embodiment corresponds to an example in which all the sub-rate conversion offset values are 0 and the same rate conversion value, that is, 2, has been applied to the left block P and the right block Q.

FIG. 24(b) illustrates an example in which RPL=2, sub-RPL=0, RPR=2, and subRPR=1. That is, the present embodiment corresponds to an example in which a sub-rate conversion offset value 1 has been applied to only the right block Q and the same rate conversion value, that is, 2, has been applied to the left block P and the right block Q. When the example of FIG. 11(b) is compared with the example of FIG. 11(a), it may be seen that the locations of all the samples in the right block Q have been shifted to the right by 1 pixel.

FIG. 24(c) illustrates an example in which RPL=1, sub-RPL=0, RPR=2, and subRPR=1. The present embodiment corresponds to an example in which a rate conversion value and a sub-rate conversion offset value are differently applied to the left block P and the right block Q. That is, a rate conversion value applied to the right block Q is two times a rate conversion value applied to the left block P, and a sub-rate conversion offset value 1 has been applied to only the right block Q. When the example of FIG. 24(c) is compared with the example of FIG. 24(b), it may be seen that the locations of all the samples in the left block P have been shifted to the block boundary by ½.

In yet another embodiment of the present invention, the values RPR, RPL, subRPL, and subRPR or the subset values of them may be determined by the encoder and the decoder from local parameters within spatio-temporally neighboring decoded pictures. For example, the local parameters may include block partitioning, coding modes, motion information, a transform type, decoded picture sample values, and other available priori information.

In yet another embodiment of the present invention, the values RPR, RPL, subRPL, and subRPR or the subset values of them may be determined may be determined by the encoder and the decoder from local parameters within spatio-temporally neighboring decoded pictures. For example, the local parameters may include block partitioning, coding modes, motion information, a transform type, decoded picture sample values, other available priori information, and a signal, such as syntax elements (i.e., a block partitioning level) or side information (e.g., SEI in the case of post-processing).

In some embodiments of the present invention, update values d0~d5 may be applied to decoded picture samples located based on a rate conversion value and a sub-rate conversion offset value as in Equation 21 below.

$$piSrc[-\text{Offset}*RPL*3+subRPL]=d0;$$

$$piSrc[-\text{Offset}*RPL*2+subRPL]=d1;$$

$$piSrc[-\text{Offset}*RPL+subRPL]=d2;$$

$$piSrc[0+subRPL]=d3;$$

$$piSrc[\text{Offset}*RPL+subRPR]=d4;$$

$$piSrc[\text{Offset}*RPL*2+subRPR]=d5; \quad [\text{Equation 21}]$$

In some embodiments of the present invention, if the value RPL, RPR is greater than 1, samples located at a sub-integer pixel grid may be updated through the interpolation of two nearest update values. For example, if RPL=RPR=2 and linear interpolation is used, Equation 22 may be obtained.

$$piSrc[-\text{Offset}*RPL*3]=d0;$$

$$piSrc[-\text{Offset}*RPL*3]=d0;$$

$$piSrc[-\text{Offset}*RPL*3+1]=(d0+d1)/2;$$

$$piSrc[-\text{Offset}*RPL*2]=d1;$$

$$piSrc[-\text{Offset}*RPL*2+1]=(d1+d2)/2;$$

$$piSrc[-\text{Offset}*RPL]=d2;$$

$$piSrc[-\text{Offset}*RPL+1]=(3*d2+d3)/4;$$

$$piSrc[0]=(d2+3*d3)/4;$$

$$piSrc[0+1]=d3;$$

$$piSrc[\text{Offset}*RPL]=(d3+d4)/2;$$

$$piSrc[\text{Offset}*RPL+1]=d4;$$

$$piSrc[\text{Offset}*RPL*2]=(d4+d5)/2;$$

$$piSrc[\text{Offset}*RPL*2+1]=d5; \quad [\text{Equation 22}]$$

In yet another embodiment of the present invention, other interpolation methods may be used to produce the sample values located at a sub-integer pixel grid. Not-limiting examples may include a quadratic, cubic, higher order, spline, transform-based interpolation, non-linear interpolation, and adaptive interpolation method.

The update values d0~d5 as well as the sample values of such samples may be calculated by stretching, interpolation, and extrapolating pulse responses provided by Equation 15 and then applying a windowing function to them.

In yet another embodiment of the present invention, an adaptive pulse response function may be derived on the decoder or encoder side through a specified process or may be signaled using syntax elements within a bit stream or side information.

In some embodiments of the present invention, if a great block size is used, in deblocking, an analysis of block border conditions using a sub-sampled version of boundary samples may be performed. Alternatively, deblocking may use filtering of a different tap length in order to incorporate information on the local complexity of a video signal.

In some embodiments of the present invention, interpolation filters having variable sampling rates may be applied depending on the complexity estimates of undergoing coding.

In some embodiments of the present invention, adaptive filters, a Sample-Adaptive Offset (SAO) filter, or transform may be applied with various sampling rates and/or tap lengths/adaptive filter coefficients based on the complexity estimates of undergoing coding.

In another embodiment to which the present invention is applied, the filtering unit 140, 230 may determine a Boundary Strength (BS) value based on at least one of the size, coding mode, and coding parameter of a block that neighbors a block boundary. Whether or not to perform filtering may be determined based on the BS value. For example, in order to determine whether or not to perform filtering, a change of a sample value may be measured based on the samples in the first row (see 1610 of FIG. 16) and the samples in the fourth row (see 1620 of FIG. 16). In such a case, the locally adaptive sampling method described in this specification may be applied.

In addition, the filtering unit 140, 230 may calculate another variable value using the quantization parameter values of blocks that neighbor the block boundary and determine whether or not to perform filtering based on another variable value. If conditions to which filtering is applied are satisfied, the filtering unit 140, 230 may select a filter type to be applied to the block boundary.

If filtering is performed on horizontal edges, it may be performed in a row unit. Furthermore, filtering may be performed on a specific number of samples on the basis of a block boundary. For example, if strong filtering is performed, three samples within a block may be used. If weak filtering is performed, two samples within a block may be used. Even in such a case, the locally adaptive sampling method described in this specification may be applied.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional (3D) video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a non-transitory computer-readable recording medium. Multimedia data having a data structure according to the present invention may also be stored in computer-readable recording media. The computer-readable recording media include all types of storage devices in which data readable by a computer system is stored. The non-transitory computer-readable recording medium may include a BD, a USB, ROM, RAM, CD-ROM, a magnetic tape, a floppy disk, and an optical data storage device, for example.

Furthermore, the computer-readable recording media includes media implemented in the form of carrier waves (e.g., transmission through the Internet). Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method of performing an interpolation filtering on a video signal, comprising:
   determining, by a filtering unit, an adaptive sampling rate based on information about properties of a decoded picture;
   performing, by the filtering unit, a first interpolation filtering using samples positioned according to the adaptive sampling rate,
   wherein the adaptive sampling rate corresponds to a variable sampling rate, and wherein the variable sampling rate indicates a non-equidistant sampling rate; and
   performing, by the filtering unit, a second interpolation filtering using samples to which the first interpolation filtering has been performed, wherein the first and the second interpolation filtering are performed at different sampling rates, and a sampling rate of the second interpolation filtering is determined based on a rate conversion parameter which is used for converting a sampling rate.

2. The method of claim 1, wherein if the adaptive sampling rate corresponds to a reduced sampling rate, the first interpolation filtering is, by the filtering unit, performed based on a uniformly reduced tap length over a filter support area.

3. The method of claim 1, wherein the second interpolation filtering is, by the filtering unit, performed within a different filter support area using samples generated by the first interpolation filtering.

4. The method of claim 1, wherein the adaptive sampling rate is, by the filtering unit, determined based on a rate conversion parameter.

5. The method of claim 4, wherein the adaptive sampling rate is, by the filtering unit, determined based on a distance function according to a position of an interpolated sample.

6. The method of claim 1, wherein the information about the properties of the decoded picture comprises at least one of a block size and a picture parameter.

7. The method of claim 6, wherein the picture parameter is obtained from a coded bit stream or derived from the decoded picture.

8. An apparatus of performing an interpolation filtering on a video signal, comprising:
   an adaptive sampling unit configured to determine an adaptive sampling rate based on property information of a decoded picture; and
   an interpolation filter configured to
   perform a first interpolation filtering using samples positioned according to the adaptive sampling rate, wherein the adaptive sampling rate corresponds to a variable sampling rate, and wherein the variable sampling rate indicates a non-equidistant sampling rate, and perform a second interpolation filtering using samples to which the first interpolation filtering has been performed, wherein the first and the second interpolation filtering are performed at different sampling rates, and a sampling rate of the second interpolation filtering is determined based on a rate conversion parameter which is used for converting a sampling rate.

9. The apparatus of claim 8, wherein when the adaptive sampling rate corresponds to a reduced sampling rate, the first interpolation filtering is performed based on an uniformly reduced tap length over a filter support area.

10. The apparatus of claim 8, wherein the interpolation filter is further configured to perform the second interpolation filtering within a different filter support area using samples generated by the first interpolation filtering.

11. The apparatus of claim 8,
wherein the adaptive sampling rate is determined based on a function of distance from an interpolated sample position.

12. The apparatus of claim 8,
wherein the property information of the decoded picture includes at least one of a block size and a picture parameter.

13. A non-transitory computer readable medium containing program instructions for causing a computer to perform the method of claim 1.

* * * * *